US008249914B2

(12) United States Patent
    Umeda

(10) Patent No.: US 8,249,914 B2
(45) Date of Patent: Aug. 21, 2012

(54) SERVICE SUPPORTING SYSTEM, SERVICE SUPPORTING SERVER AND SERVICE SUPPORTING METHOD

(76) Inventor: Toshihiko Umeda, Yokohama (JP)

( * ) Notice: Subject to any disclaimer, the term of this patent is extended or adjusted under 35 U.S.C. 154(b) by 1352 days.

(21) Appl. No.: 10/746,890

(22) Filed: Dec. 24, 2003

(65) Prior Publication Data

US 2004/0143498 A1    Jul. 22, 2004

(51) Int. Cl.
    *G06Q 10/00*    (2012.01)
(52) U.S. Cl. ..................... 705/7.32; 705/7.12
(58) Field of Classification Search .............. 705/10, 705/7.12, 7.32
    See application file for complete search history.

(56) References Cited

U.S. PATENT DOCUMENTS

| | | | | |
|---|---|---|---|---|
| 5,960,337 A * | 9/1999 | Brewster et al. | ............ | 455/404.2 |
| 6,003,070 A * | 12/1999 | Frantz | ............ | 709/206 |
| 6,035,187 A * | 3/2000 | Franza | ............ | 455/404.1 |
| 6,169,483 B1 * | 1/2001 | Ghaffari et al. | ............ | 340/572.3 |
| 6,380,928 B1 * | 4/2002 | Todd | ............ | 345/169 |
| 6,381,744 B2 * | 4/2002 | Nanos et al. | ............ | 725/24 |
| 6,624,843 B2 | 9/2003 | Lennon | | |
| 6,970,831 B1 * | 11/2005 | Anderson et al. | ............ | 705/11 |
| 7,065,494 B1 * | 6/2006 | Evans | ............ | 705/10 |
| 7,308,246 B2 * | 12/2007 | Yamazaki et al. | ............ | 455/404.1 |
| 2002/0087892 A1 * | 7/2002 | Imazu | ............ | 713/202 |
| 2002/0091821 A1 * | 7/2002 | Katayama et al. | ............ | 709/224 |
| 2002/0138338 A1 * | 9/2002 | Trauth et al. | ............ | 705/10 |
| 2003/0101082 A1 * | 5/2003 | Volpe et al. | ............ | 705/8 |
| 2004/0148178 A1 * | 7/2004 | Brain, II | ............ | 705/1 |

FOREIGN PATENT DOCUMENTS

| | | |
|---|---|---|
| JP | 10-097575 | 4/1998 |
| JP | 11232459 A | 8/1999 |
| JP | 2000105583 A | 4/2000 |
| JP | 2001202090 A | 7/2001 |
| JP | 2002-015192 | 1/2002 |
| JP | 2002007683 A | 1/2002 |
| JP | 2002073887 A | 3/2002 |
| JP | 2002-108990 | 4/2002 |
| JP | 2002133063 A | 5/2002 |
| JP | 2002157492 A | 5/2002 |
| JP | 2002342804 A | 11/2002 |
| JP | 2002-373239 | 12/2002 |
| JP | 2003122872 A | 4/2003 |

OTHER PUBLICATIONS

David Cunado, et al., "Gait Extraction and Description by Evidence-Gathering," Proceeding of the Second International Conference on Audio and Video-based Person Identification 43-48 (1999).*
David Cunado, et.al., "Gait Extraction and Description by Evidence-Gathering", distributed in Proceeding of the Second International Conference on Audio and Video-based Person Identification, Washington, DC, on Mar. 22-23, 1999, pp. 43-48.

* cited by examiner

*Primary Examiner* — Neil Kardos
(74) *Attorney, Agent, or Firm* — Baker & Hostetler LLP

(57) ABSTRACT

A service supporting server that supports a service operation for a customer, and a terminal which can communicate with the service supporting server comprising a display part displaying a questionnaire; an inputting part for causing a customer to input for filling in the questionnaire; and a questionnaire transmission part transmitting the thus filled-in questionnaire to the service supporting server. The service supporting server comprises a filled-in questionnaire analysis part analyzing the received filled-in questionnaire.

8 Claims, 25 Drawing Sheets

FIG.4

| ROOM NAME | IMAGE DATA |
|---|---|
| ROOM A1 | ROOM A1 IMAGE DATA |
| ROOM A2 | ROOM A2 IMAGE DATA |
| ROOM A3 | ROOM A3 IMAGE DATA |
| ROOM A4 | ROOM A4 IMAGE DATA |
| ... | ... |

FIG.5

| |
|---|
| QUESTIONNAIRE A |
| QUESTIONNAIRE B |
| QUESTIONNAIRE C |
| ... |
| QUESTIONNAIRE N |

FIG.6

| CUSTOMER ID | ROOM NO. | ROOM | BATH | LAVATORY | LIGHTING | BED | CORRIDOR | FAILURE | SATISFACTION | ROOM CANDIDATE |
|---|---|---|---|---|---|---|---|---|---|---|
| 123456 | A1 | 2 | 0 | 2 | 0 | 2 | 1 | 4 | 2 | A2 |
| 10007 | A2 | 2 | 1 | 2 | 0 | 2 | 1 | 0 | 0 | A3 |
| ... | ... | ... | ... | ... | ... | ... | ... | ... | ... | ... |
| 316 | B3 | 1 | 2 | 2 | 1 | 2 | 1 | 0 | 1 | A5 |

FIG. 7

| RESERVATION ID | CUSTOMER ID | STAY DATE | STAY DAYS | ROOM NO. | ADDRESS | TELEPHONE | NAME | STAY HISTORY | RELEVANT INFORMATION |
|---|---|---|---|---|---|---|---|---|---|
| 1230012 | 126000 | 2002.4.1 | 2 | A1 | ○○PREF.△CITY××5-3-4 | ○○○-○○○○ | BYY/AXX/MR | 3TIMES | EXISTS |
| 1230013 | 6543 | 2002.4.1 | 3 | B1 | ○○PREF.△CITY××2-1-1 | ○○-○○○○ | CZZ/BXX/MRS | 10TIMES | EXISTS |
| 1230014 | 826000 | 2002.4.1 | 1 | A3 | ○○PREF.△CITY××1-7-2 | ○○○-○○○○ | DXX/CYY/MR | 0TIMES | N/A |
| ... | ... | ... | ... | ... | ... | ... | ... | ... | ... |

| LAVATORY /BATH | ELECTRIC APPLIANCE | LINEN |
|---|---|---|
| 1234 | 2345 | 3456 |
| 1345 | 2456 | 3567 |
| ... | ... | ... |

FIG.11

51 — IF YOU FILL QUESTIONNAIRE, COUPON OF 30% DISCOUNT IS PRESENTED!

YEAR/MONTH/DATE
STORE XYZ
N

BASIC ITEMS (52)

YOUR ROOM NO.?
A B C D E F
○ ○ ○ ○ ○ ○
1 2 3 4 5 6
○ ○ ○ ○ ○ ○

LINEN CLEANING ITEMS (53)

ROOM CLEAN?    GOOD  NOT TOO BAD  BAD
                ○       ○         ○
BATHTUB CLEAN?  GOOD  NOT TOO BAD  BAD
                ○       ○         ○
LAVATORY CLEAN? GOOD  NOT TOO BAD  BAD
                ○       ○         ○
LIGHTINGS BLOWN? GOOD NOT TOO BAD  BAD
                ○       ○         ○
BED CLEAN?      GOOD  NOT TOO BAD  BAD
                ○       ○         ○
CORRIDOR CLEAN? GOOD  NOT TOO BAD  BAD
                ○       ○         ○

EMERGENCY RESPONSE ITEMS (54)

ROOM FAILURE?   NONE  BATH  LAVATORY  TV  BED
                 ○     ○       ○      ○   ○
ROOM SATISFIED? SATISFY  NOT TOO GOOD  BAD
                  ○           ○        ○

CUSTOMER PREFERENCE ITEMS (55)

WHICH ROOM YOU PREFER FOR NEXT STAY?    COMMENT (HANDWRITING)
A B C D E F
○ ○ ○ ○ ○ ○
1 2 3 4 5 6
○ ○ ○ ○ ○ ○

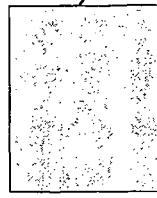
57

SEND (56)     CANCEL (58)

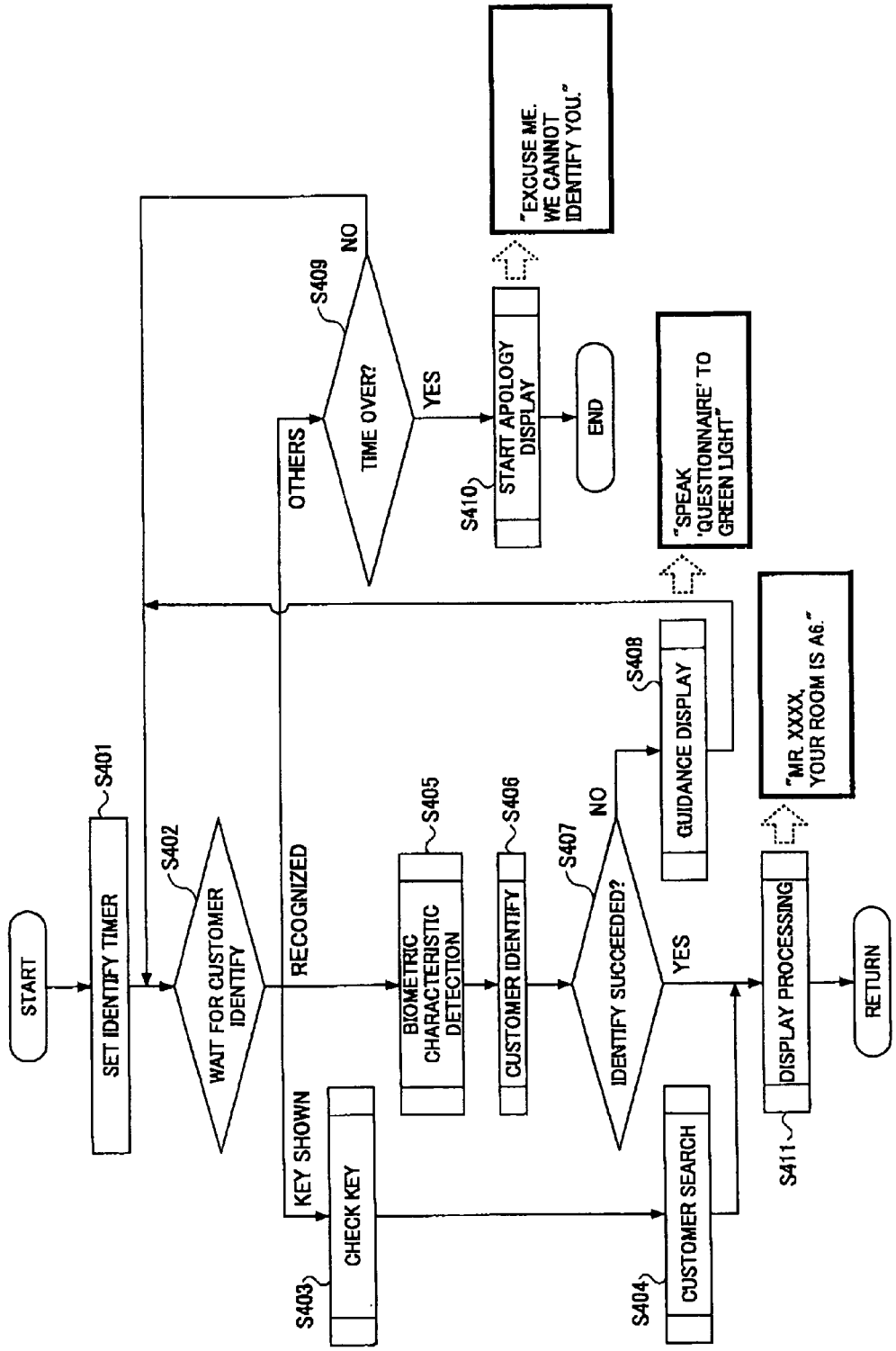

FIG.23

IF YOU FILL QUESTIONNAIRE,
COUPON OF 30% DISCOUNT IS PRESENTED!

YEAR/MONTH/DATE
STORE XYZ

SHOW YOUR ROOM KEY,
OR SPEAK "DON'T HAVE"

| YOUR ROOM IS A6. | 101 | | | EXPRESS CHECKOUT | #N | 102 |

ROOM CLEAN?    GOOD   NOT TOO BAD   BAD
○    ○    ○

BATHTUB CLEAN?    GOOD   NOT TOO BAD   BAD
○    ○    ○

LAVATORY CLEAN?    GOOD   NOT TOO BAD   BAD
○    ○    ○

LIGHTINGS BLOWN?    GOOD   NOT TOO BAD   BAD
○    ○    ○

BED CLEAN?    GOOD   NOT TOO BAD   BAD
○    ○    ○

CORRIDOR CLEAN?    GOOD   NOT TOO BAD   BAD
○    ○    ○

ROOM FAILURE?    NONE   BATH   LAVATORY   TV   BED
○    ○    ○    ○    ○

ROOM SATISFIED?    SATISFY   NOT TOO GOOD   BAD
○    ○    ○

WHICH ROOM YOU PREFER FOR NEXT STAY?     COMMENT (HANDWRITING) — 57

A   B   C   D   E   F
○   ○   ○   ○   ○   ○

1   2   3   4   5   6
○   ○   ○   ○   ○   ○

| SEND | CANCEL |
| 56 | 58 |

BASIC ITEMS — 52
LINEN CLEANING ITEMS — 53
EMERGENCY RESPONSE ITEMS — 54
CUSTOMER PREFERENCE ITEMS — 55

Mr.YAMADA

Amount : $XYZ

18.DEC.2003

International Hotels

SERVICE SUPPORTING SYSTEM, SERVICE SUPPORTING SERVER AND SERVICE SUPPORTING METHOD

BACKGROUND OF THE INVENTION

1. Field of the Invention

The present invention relates to support for service work, and, in particular, to a service supporting system, a service supporting server and a service supporting method for supporting service work.

2. Description of the Related Art

A method of obtaining selection questionnaires from hotel users concerning attributes, preference and so forth, so as to achieve work improvement or preparing a service project has been proposed (for example, see Japanese Laid-Open Patent Application No. 2002-73887: patent document #1). Furthermore, a method for performing marketing with the use of questionnaires obtained from an accommodation facility has been proposed (see Japanese Laid-Open Patent Application No. 2002-133063: patent document #2).

Further, a business method of sending out, collecting and analyzing questionnaires for hotel service which may be applied to hotel users, dispatching direct mail and thus managing customers so as to win customers has been proposed (see Japanese Laid-Open Patent Application No. 2002-157492: patent document #3). According to this method, a member is managed with his/her entire family, rewarding points on usage experiences is performed for the family members, and thus a return to the customer is performed with a pay back according to the usage experiences or bonus presentation.

In such a questionnaire survey, if another evaluator who looks like a proper evaluator fills out a questionnaire, the reliability in the questionnaire survey is lost. Such a problem concerning the difference between appearance and substance of an evaluator may occur, for example, in a case where a coupon is given to an evaluator, which coupon has the evaluator's information written thereon, and said evaluator who receives the coupon delivers the coupon to a third person who then uses a hotel and fills out a questionnaire.

Thus, to identify a person himself or herself is an essential matter in a questionnaire survey. Japanese Laid-Open Patent Application No. 2001-202090 (patent document #4) discloses to record, upon booking, personal information (biography) written on a name card, a face picture, voice sound with a microphone, body height with two sets of cameras, and also weight, body temperature, fingerprints, and smell with a biometric sensor.

Japanese Laid-Open Patent Application No. 2002-342804 (patent document #5) discloses, with reference to 'Gait Extraction and Description by Evidence-Gathering' by David Cunado, Jason M. Nash, Mark S. Nixon and John N. Carter, Department of Electronics and Computer Service, University of Southampton, Southampton SO17, 1BJ, UK, distributed in Proceeding of the Second International Conference on Audio and Video-based Person Identification, Washington, D.C., Mar. 22-23, 1999, pages 43-48 (non-patent document #1), to report personal information of a visitor before a visit, to take a video of the visitor's facial picture at a reception with/ without his or her permission, or to record his/her history at a hotel where he or she stays.

Japanese Laid-Open Patent Application No. 2003-122872 (patent document #6) discloses a system producing an ID card which a visitor carries. Japanese Laid-Open Patent Application No. 2000-105583 (patent document #7) discloses, with citing (Japanese) Video Information Media Society Journal, Vol. 51, No. 8, pages of 1132-1135 (1997) (non-patent document #2), a related art case identifying a person from a face thereof. Japanese Laid-Open Patent Application No. H11-232459 (patent document #8) discloses a method for fingerprint identification with obtaining numerical data from characteristic point data. Japanese Laid-Open Patent Application No. 2002-7683 (patent document #9) discloses a customer managing system which uses biometric information as a key wherein a method is proposed to identify a customer by matching of facial print information obtained from a face picture.

SUMMARY OF THE INVENTION

The method described above in the first paragraph of the Description of the Related Art is to total up results of preference questionnaires or usage questionnaires with the use of communication medium such as the Internet, according to a conventional way.

The method described above in the second paragraph can be described as being a proposal only in terms of obtaining preference information by means of questionnaires having a linkage with a family attribute.

Generally speaking, in order to maintain a fixed service quality, a service business performs quality maintenance in order that a service provider maintains a service facility in an original condition, where the work is shared by separate persons, i.e., a person in change of daily maintenance work and a person in charge of checking whether the maintenance work has been performed well.

Furthermore, it is common practice for a service project preparation division to conduct research for the service contents and service charges of other competing companies by means of industry meetings, industry newsletters, and also by means of actual experience of the service, so as to maintain competitiveness. For example, in fact, with reference to FIG. 26 showing a work flow of the hotel business, there are a 'cleaning agency' which performs room cleaning and bed making, a 'checker' who checks the results thereof, and, also, it is common practice to provide a 'research person' especially for performing research and analysis of the competing company information.

The role of this checker is important. In fact, it is known that such a checker donates his best effort and time for this purpose. For example, in a facility which provides a high-price service, the checker lies down in an empty bathtub with his work suit so as to check the maintenance results there, performs a check by sitting down on a lavatory, records results on a check sheet, and so forth.

As another example, in a small sized facility, actually, a 'cleaning agency' performs cleaning work as a part-time job on a day-by-day rotation basis, while the check work is performed by a business manager himself/herself or a family member of the business manager.

For such a service, a questionnaire survey is provided to users. However, generally speaking, many users may not answer such questionnaires, and thus there is a demand for a measure to efficiently collect information on customer's needs, service improvement requests, and so forth. The actual status of such questionnaire surveys is such that it is generally understood in a service business that filled-in questionnaires are rarely collected in a collection box anonymously in many cases, totaling up thereof takes time and thus it is difficult to obtain real users' needs.

This is because, due to a business characteristic, assuming a repeater's usage way, a user who receives a service in many case may consider that, to makes complaints about the service given, or to propose service improvement leads to evaluation of service staff members who actually provide the service, which then may not actually be beneficial to the user himself/herself.

Therefore, the contents of filled-in questionnaires in many cases include general proposals for facilities, or excessively admiring contents in one case rather than complaints about staff members from whom the evaluator received the services. In some cases, contents which indicate some complaints may appear in small numbers from among such admiring contents. In any case, skill, experience and determination are needed to precisely analyze such questionnaire results collected.

Furthermore, troublesome work may be included in totaling up collected questionnaire results such as to send a polite thank-you letter to an evaluator who has returned a questionnaire with his/her real name and/or with a useful indication. Otherwise, such useful information may not be obtained again. Then, it is true that such troublesome work may all be shifted into the costs of the service, and thus, a vicious cycle may occur. Thus, it is not too much to say that a service business is to provide labor with a delicate charity, and provide equipment and location.

As to a background art for identifying a person himself/herself, the related art cases disclosed by the above-mentioned patent documents #4, #5 and #6 are advantageous as a security measure for protecting a relevant enterprise from a visitor who visits the enterprise, but they cannot be applied to a service business which the general public uses.

This is because, according to a business characteristic, in a serviced business (except some locations and any sales facility), identification confirmation is not performed on a user, or, even in a case where identification confirmation is performed on a user, the user is asked to make a minimum declaration by a service provider according to a relevant local law.

Thus, a service business needs to make efforts and absorbs costs for providing a service, and, in many cases, a usage charge for a customer reflects the costs thereof. Furthermore, upon obtaining information by means of questionnaires, it is essential to identify evaluators (customers) from whom the questionnaire results were collected.

The present invention has been devised in consideration of these problems, and an object of the present invention is to provide a service supporting system, a service supporting server and a service supporting method in which the effort for and cost of a service are effectively reduced usage charges for customers are effectively reduced, and also, precise information concerning customers is efficiently acquired.

According to the present invention, a service supporting system includes a service supporting server supporting service operations for a customer, and a terminal which can communicate with the service supporting server; wherein the terminal comprises a display part displaying a questionnaire, an inputting part for causing a customer to input for the questionnaires and a questionnaire transmission part transmitting the thus filled-in questionnaire to the service supporting server; and the service supporting server comprises a filled-in questionnaire analysis part analyzing the received filled-in questionnaire.

In the service supporting system, the inputting part may include a touch panel.

In the service supporting system, the inputting part may be configured to accept voice input.

The service supporting system may further include a service information outputting terminal which outputs information concerning a service for a customer who has input for the questionnaire.

In the service supporting system, the service outputting terminal may include a portable terminal; and the service information may be displayed on a display screen of the portable terminal in the form of barcode or character information.

In the service supporting system, the service outputting terminal may include a printing apparatus; and the service information may be printed out from the printing apparatus in the form of barcode or character information.

In the service supporting system, the information concerning the customer may include charge discounting information.

In the service supporting system, the contents of the questionnaire may include information evaluating the service.

In the service supporting system, the contents of the questionnaire may include information concerning equipment failure.

In the service supporting system, when an equipment failure is reported by the questionnaire analysis part from the information concerning the equipment failure, the system may report the equipment failure to a terminal of a person who manages the relevant equipment.

In the service supporting system, the contents of the questionnaire may include information concerning another party which competes for the same service.

A service supporting server according to the present invention supporting service operations for a customer with the use of at least one terminal which can communicate with the service supporting server, includes an input persuading information display part displaying information persuading a customer to input for a questionnaire concerning service operations; a questionnaire display part displaying on the terminal the questionnaire; a questionnaire analysis part analyzing the filled-in questionnaire received from the terminal; and a service information outputting part outputting information concerning a service for a customer on another terminal.

A service supporting method according to the present invention for supporting service operations with the use of at least one communicatable terminal, includes a questionnaire display step of displaying a questionnaire concerning service operations on the terminal; an analysis step of analyzing a filled-in questionnaire received from the terminal; and a service information outputting step of outputting information concerning a service for a customer on another terminal.

A service supporting system according to the present invention includes a service supporting server supporting service operations for a customer and a terminal communicatable with the service supporting server; the terminal includes a part identifying a customer, a display part displaying a questionnaire concerning service operations, an inputting part causing the customer to input for the questionnaire, and a questionnaire transmission part transmitting the input questionnaire result to the service supporting server; and the service supporting server includes a questionnaire analysis part analyzing the received questionnaire result.

A service supporting system according to the present invention includes a service supporting server supporting service operation for a customer and a terminal communicatable with the service supporting server; and the terminal includes a part extracting biometric characteristics of the customer, a display part displaying a questionnaire concerning service operations, an inputting part causing the customer to input for the questionnaire; a questionnaire transmission part transmitting the biometric characteristics and the input questionnaire result to the service supporting server; and the service supporting server includes a part searching a customer database for the received customer's biometric characteristics, and a questionnaire analysis part analyzing the questionnaire result.

A service supporting system according to the present invention includes a service supporting server supporting service operations for a customer and a terminal communicatable with the service supporting server; the terminal includes a part extracting biometric characteristics of the customer; a part for inputting a biography which is information concerning the customer and declared by the customer, and a part transmitting the biometric characteristics and the input biography to the service supporting server; the service supporting server includes a part searching a customer database for the received customer's biometric characteristics, and a part transmitting the search result to the terminal; and the terminal comprises a part displaying the search result sent from the service supporting server.

The service supporting system may include a part displaying or printing the customer's biography.

The service supporting system may include a part displaying or printing a service usage history of the customer.

In the service supporting system, the customer's biometric characteristics may include at least one of facial features, fingerprints, iris code, voiceprint, body height and gait.

According to the present invention described above, it is possible to provide a service supporting system, a service supporting server and a service supporting method in which the effort and expense needed for a service are reduced, usage charges for customers are reduced, and also, precise information concerning customers is acquired.

Other objects and further features of the present invention will become more apparent from the following detailed description when read in conjunction with the accompanying drawings.

BRIEF DESCRIPTION OF DRAWINGS

FIG. 4 shows a room image DB;
FIGS. 5 and 6 show a questionnaire DB;
FIG. 7 shows a reservation DB;
FIG. 11 shows a questionnaire window;
FIG. 22 shows a flowchart of processing for identifying a customer;
FIG. 23 shows a questionnaire window;

DETAILED DESCRIPTION OF THE PREFERRED EMBODIMENTS

Two embodiments of the present invention will now be described with reference to figures. A first embodiment relates to a basic configuration for embodying the present invention for obtaining information by means of questionnaires. A second embodiment relates to a configuration the same as the first embodiment additionally including processing for identifying a customer.

Figure 1:
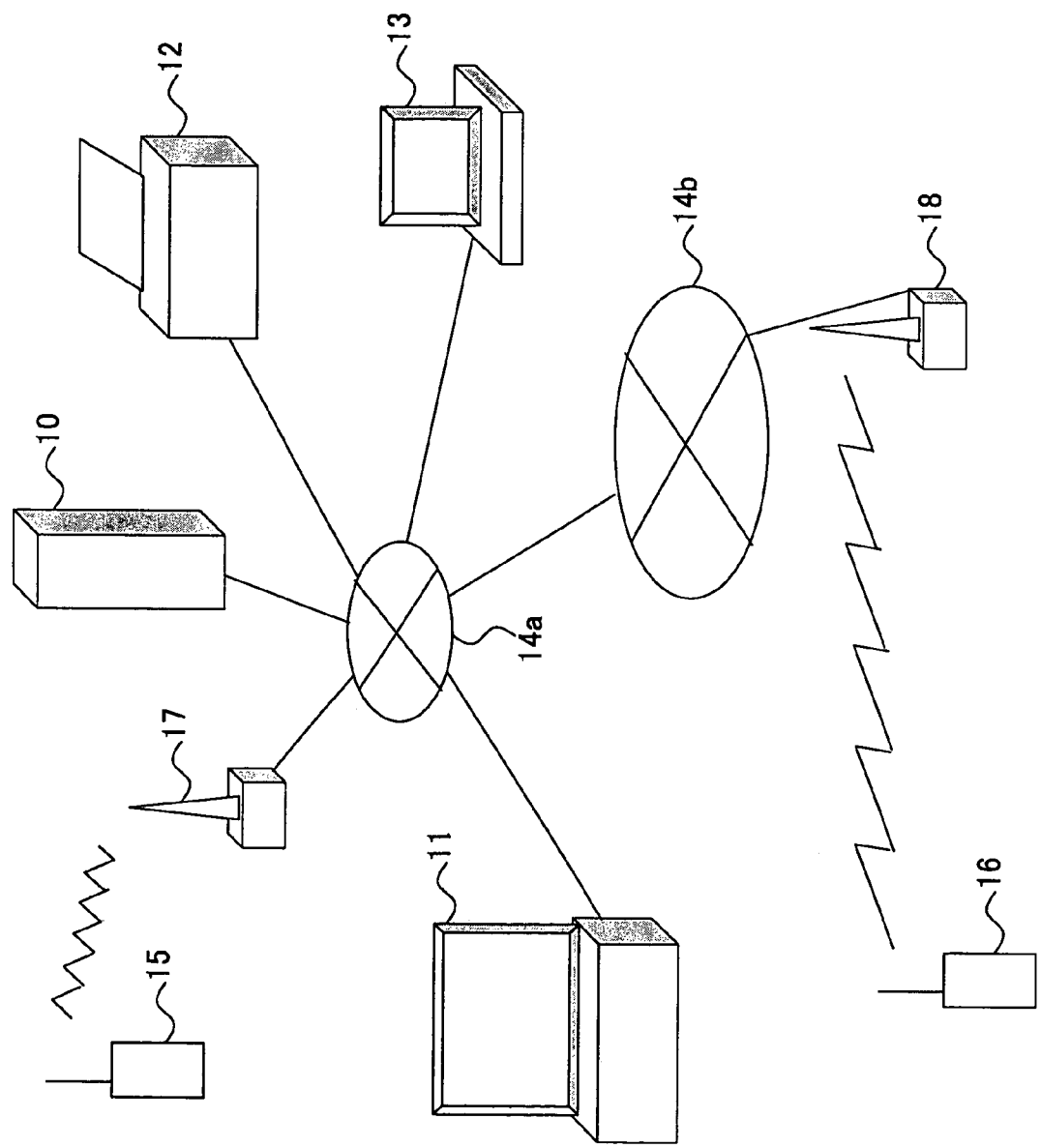
FIG. 1 shows a general arrangement of embodiments of the present invention.

FIG. 1 shows a general configuration of the first embodiment. FIG. 1 shows a service supporting server 10, a customer terminal 11, a front terminal 13, a printer 12, an extension base station 17, networks 14a, 14b, a cellular phone base station 18, a staff portable terminal 15, and a customer portable terminal 16.

The service supporting server 10 performs various types of processing concerning service operations. The customer terminal 11 is provided in a guest room or on a front desk, and is used for inputting for a questionnaire, guidance for a guest room and so forth. The front terminal 13 is used for customer management, questionnaire inspection and so forth. The printer 12, which acts as a service information outputting device is used for discount ticket issuance, described later, and so forth. The extension base station 17 is a base station for the staff probable terminal 15 which a staff member carries.

The staff portable terminal 15 is a PDA or a personal computer having a radio IP communication function such as that according to a radio standard a, b, g, h, n or zig, of IEEE 802.11, or IEEE 802.16a, or a composite terminal of a public cellular phone and a radio PDA. Further, the extension base station 17 is also used as a local access point for the PDA or personal computer having a radio IP communication function, or the composite terminal of a public cellular phone and a radio PDA of a customer.

The cellular phone base station 18 is, for example, a base station for cellular phones of a type I carrier. The portable terminal 16 is a customer's personal cellular phone, and acts as a service information outputting device in the first embodiment.

The network 14a is a VPN (virtual private network) to which each hotel terminal is connected in the case of a hotel in a national chain, or a LAN in a case where communications are performed within a hotel. The network 14b is, for example, a public circuit.

In FIG. 1, each of the service supporting server 10, customer terminal 11, front terminal 13, printer 12, extension base station and so forth is shown as if only one unit is provided in the system. However, it is also possible that each of them is provided in a plurality of units as is necessary, where the number of units to be provided depends on each particular situation. For example, in case of a national chain, the customer terminals 11 and front terminals 13 should be provided at least one for each hotel, and, thus, a plurality of units thereof should be provided.

Figure 2:
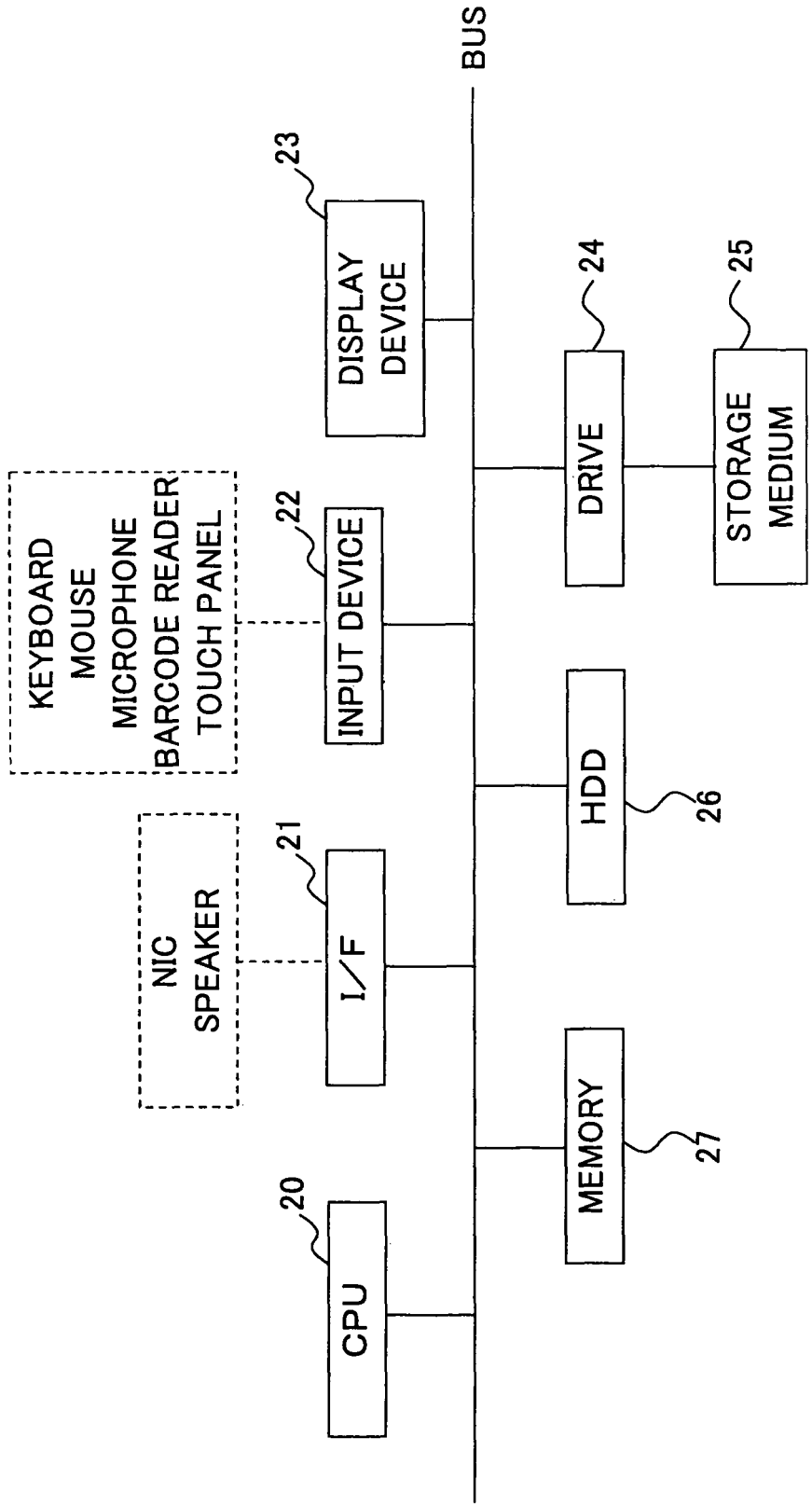
FIG. 2 shows a hardware configuration.

FIG. 2 shows a hardware configuration of each of the service supporting server 10, customer terminal 11 and front terminal 13.

As shown, the hardware configuration includes an input device 22, a drive 24, a storage medium 25, a HDD (hard disk drive) 26, a memory 27, a CPU 20, and an IF (interface) 21, which are mutually connected by a bus. The input device 22 acting as an inputting part includes a keyboard, a mouse, a touch panel, a barcode reader or the like which a user of the computer system operates, and is used for the user to input various operation signals to the computer system.

The display device 23 displays various windows or data necessary for operating the computer system. The interface device 21 includes a NIC (network interface card), a modem, a connection terminal to a speaker, and so forth, which are used for connecting the computer system to the network.

A program for operating the computer system is provided through a storage medium 25 such as a CD-ROM or so, or is downloaded via the network. The recording medium 25 is loaded into the drive 24, and data or a program is read out therefrom, and then, is installed in the HDD 26 via the drive 24.

The HDD 26 stores data or programs, and also stores necessary files and so forth. In the memory 27, a program read out from the HDD 26 at a time of starting the computer system is stored. The CPU 20 executes processing according to the program thus stored in the memory 27.

Figure 3:
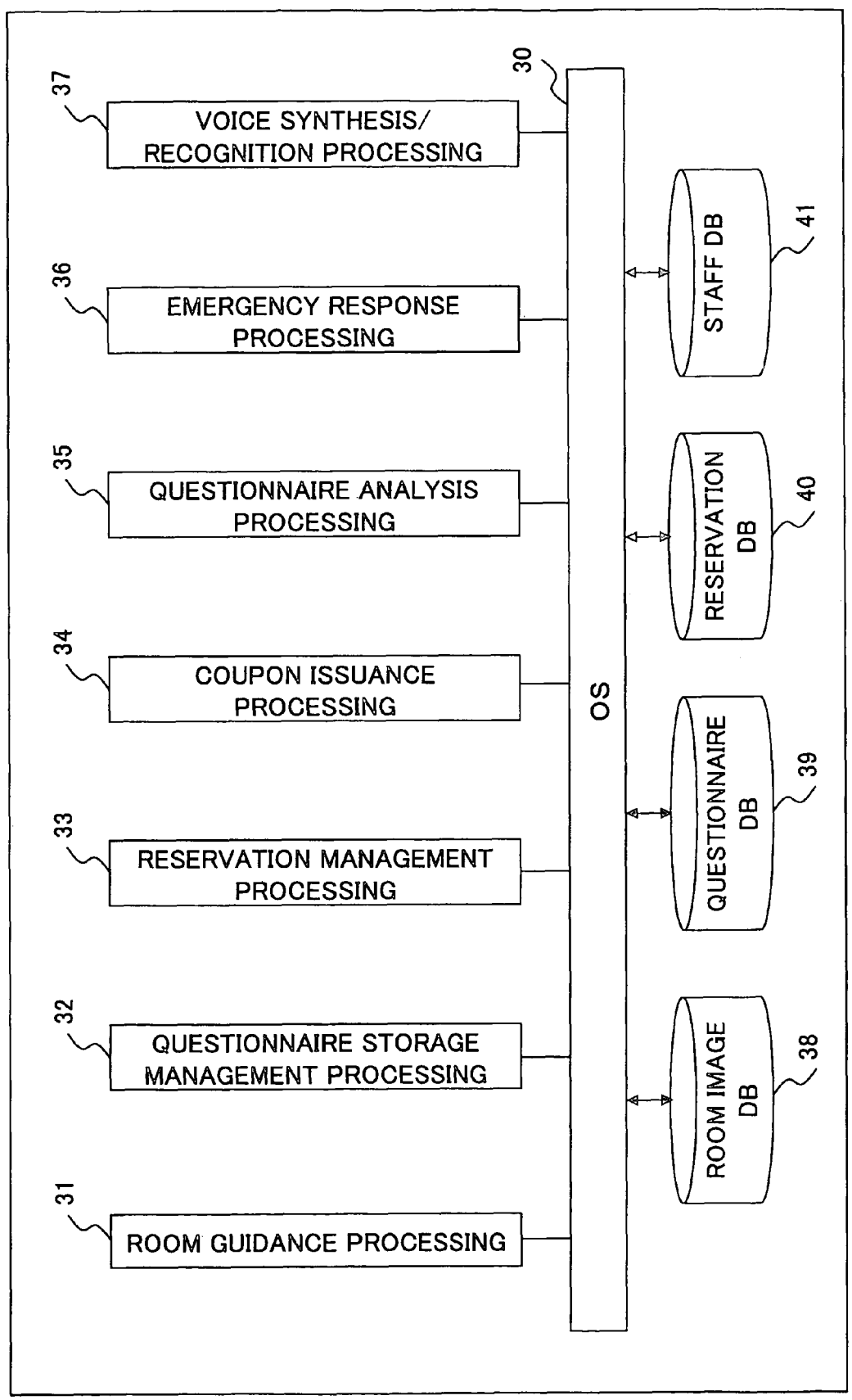
FIG. 3 shows a software block diagram.

FIG. 3 shows a software configuration of the service supporting server 10. As shown, the software configuration includes an OS (operating system) 30, a room guidance processing part 31, a questionnaire storage management processing part 32, a reservation management processing part 33, a discount ticket (coupon) issuance processing part 34, a questionnaire analysis part 35, an emergency response processing part 36, a voice synthesis/recognition processing part 37, a room image DB 38, a questionnaire DB 39, a reservation DB 40, and a staff DB 41.

The OS 30 is software performing computer system management and providing a basic user operations environment. The room guidance processing part 31 acting as a questionnaire display part reads image data from the room image DB 38 corresponding to a room which a customer has selected, and displays the same on the customer terminal 11. Further, the room guidance processing part 31 also displays a questionnaire on the customer terminal 11.

The questionnaire storage management processing part 32 stores a questionnaire result from a customer in the questionnaire DB 39. The reservation management processing part 33 performs processing concerning reservations with the use of the reservation DB 40.

The discount ticket issuance processing part 34 acting as a service information outputting part outputs via the printer 12 a discount ticket discounting a usage charge, as information concerning a service for a customer, transmits barcode or character information corresponding to the discount ticket to the portable terminal 16 via the public cellular phone network, or to the address of a customer via the Internet.

The questionnaire analysis processing part 35 acting as a questionnaire analysis part performs analysis of filled-in questionnaires returned by customers, or, if necessary, transmits a message to the emergency response processing part 36 in order that the emergency response processing part 36 may perform reporting processing to the staff portable terminal 15. The emergency response processing part 36 is responsive to the questionnaire analysis result, and, in a case where an emergency matter occurs such as a request for repairing failed facilities, performs reporting processing for the staff portable terminal 15 of a staff member who is in charge of the relevant matter.

The voice synthesis/recognition processing part 37 performs voice synthesis or recognition with the use of hardware or software. Voice is transmitted to the service supporting server 10 from the customer terminal 11, and in this case, the voice may be transmitted after it is encoded via a software codec or so.

The respective DBs shown in FIG. 3 will now be described. The room image DB 38 will now be described with reference to FIG. 4. As shown in FIG. 4, the room image DB 38 includes 'room name' and 'image data' corresponding thereto. For example, for the room name of 'room A2', 'room A2 image data' is stored.

With reference to FIGS. 5 and 6, the questionnaire DB 39 will now be described. As shown in FIG. 5, the questionnaire DB 39 has a configuration in which particular questionnaire results are arranged. Each thereof has a configuration shown in FIG. 6.

As shown in FIG. 6, the data configuration of the questionnaire DB 39 includes 'customer ID', 'room number', 'room', 'bathtub', 'lavatory', 'lighting', 'bed', 'corridor', 'failure', 'satisfaction' and 'room candidate'.

Thereamong, 'customer ID' denotes an ID of a customer who answered the questionnaire, and is determined uniquely. 'Room number' denotes a number of a room which the customer used.

'Room', 'bath', 'lavatory', 'bed' and 'corridor' correspond to items of evaluation information for a service, and indicate whether these items have been serviced so that they are clean. The numeral shown in each item has the following meaning: '0' means that the item is dirty; '1' means that the item is not so bad; and '2' means that the item is clean.

'Lighting' and 'room' correspond to information concerning failure, and indicate whether the lighting or the room has failures. Thereamong, the numeral '0' shown for the item 'lighting' means that the lighting fixture is not blown, and '1' means that the lighting fixture is blown. Further, the numeral '0' show for the item of 'failure' means that there is no failure, '1' means that the bath has had a failure, '2' means that the lavatory has had a failure, '3' means that the TV has had a failure, and '4' means that the bed has had a failure.

'Satisfaction' corresponds to information of evaluation for a service, and indicates how much the customer is satisfied the service. The numeral '0' of this item means that the service was satisfactory, '1' means that the service was not so bad, and '2' means that the service was bad and not satisfactory. 'Room candidate' indicates the number of a room which a customer wishes to use at the next time.

For example, in FIG. 6, a customer having the customer ID of '10007' stayed in a room number A2, answered that the room, lavatory and bed were clean, the bathtub and the corridor were not so bad. Furthermore, this customer answered that no lighting fixture was blown, nothing had a failure, and the service was satisfactory. Furthermore, this customer answered that he/she wished to use room number A2 the next time.

With reference to FIG. 7, the reservation DB 40 will now be described. The data structure of the reservation DB 40 includes, as shown in FIG. 7, 'reservation ID', 'customer ID', 'stay date' 'stay days', 'room number', 'address', 'telephone', 'name', 'stay history', and 'relevant information'.

Thereamong, 'reservation ID' is an ID used for managing the reservation DB 40. 'Customer ID' is an ID of a customer who made the reservation. It is noted that in case of a new costumer, a new number is assigned therefor.

'Stay date' denotes a date from which the stay starts. 'Stay days' denotes how many days the customer stays. 'Room number' denotes a number of a room the customer stays. 'Address' denotes the address of the customer who reserved. 'Telephone' denotes the telephone number of the customer. 'Name' denotes the name of the customer. 'Stay history' denotes how many times the customer has stayed there (or another hotel or so) previously. 'Relevant information' indicates, for example, whether there is a questionnaire filled-in by the customer previously. It is also possible to add another item such as the age of the user, or so.

Figures 8, 9:
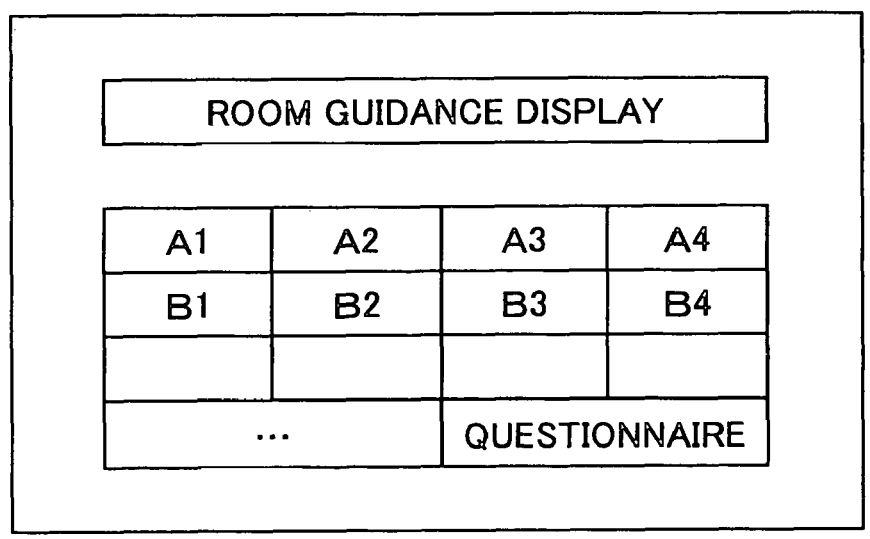
FIG. 8 shows a staff DB.
FIG. 9 shows a guidance display window.

With reference to FIG. 8, the staff DB 41 will now be described. The data structure of the staff DB 40 includes three items, i.e., lavatory/bath staff, electric appliance staff and linen staff, and has an extension telephone number of a staff portable terminal, a cellular phone number, a mail address and an IP telephone number of the relevant staff for each of these items.

For example, the staff for lavatory/bath has the extension telephone number of '1234', the cellular phone number of '1345', the mail address of 'water_chief@tokyo.interhotel.com' (not shown), and the IP telephone number of '202.33.14.182' (not shown). The staff for electric appliance has the extension telephone number of '2345', the cellular phone number of '2456', the mail address of 'power_chief@tokyo.interhotel.com' (not shown), and the IP telephone number of '202.33.14.186' (not shown).

Thus, the plurality of numbers are provided for each staff because, even when the staff is engaged, another communication measure can be used for positively making a contact with the staff. If there is no such a necessity, only a single communication measure may be sufficient.

The extension telephone number is for the staff radio extension telephone portable terminal, the cellular phone number is for the cellular phone, the mail address is for electronic mail via the above-mentioned PDA or personal computer having the IP communication function, and the IP telephone number is for voice communications via the PDA or personal computer having the VoIP (Voice over IP) communication function.

Processing performed by the above-described software configuration will now be described. First, a room guidance display function by which a customer can check what kind of room the customer will stay in will now be described with reference to FIG. 9.

Figure 10:
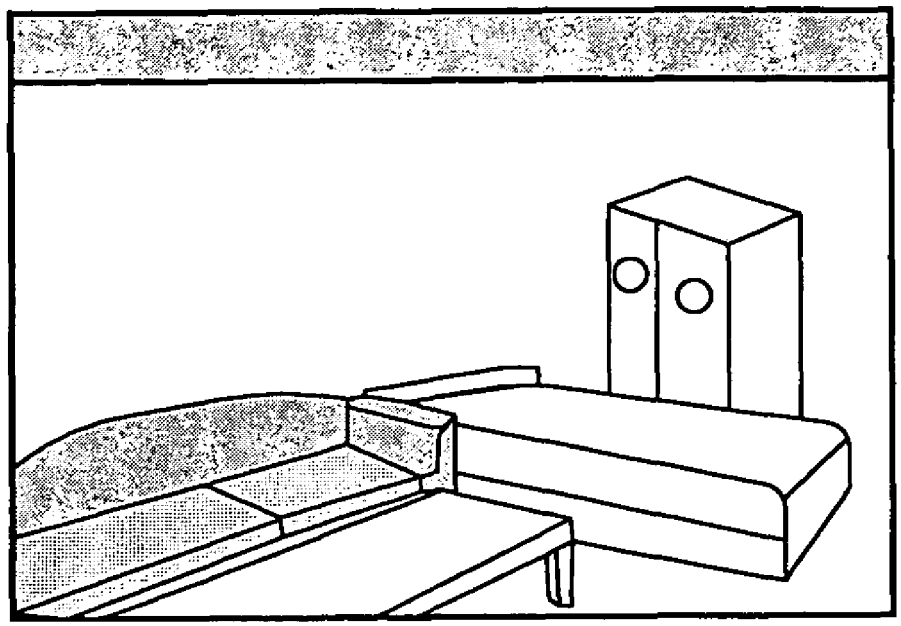
FIG. 10 shows a state in which a room picture is displayed.

FIG. 9 shows a guidance display window displayed on the touch panel screen of the customer terminal 11 provided on the front desk. As shown, this window includes room number buttons and a questionnaire button. For example, when the A2 button is pressed by a customer, a photo of the corresponding room is displayed on the screen, as shown in FIG. 10.

Thus, a customer can see the room by a photo thereof. In a case where the questionnaire button is pressed, the following processing is performed.

When a customer presses the questionnaire button, a questionnaire window shown in FIG. 11 is displayed on the screen. This questionnaire window displays information 51 urging the customer to input for the questionnaire, i.e., 'if you answer the questioner, 30% discount ticket is presented', or so.

Items for the customer to input for the questionnaire include basic items 52, linen cleaning items 53, emergency response items 54 and customer preference items 55. Each of these items includes further items described above to select.

Radio buttons are used by which the customer can make input for the questionnaire.

Other than the radio buttons, a hand writing space 57 is provided in which the customer can make input by hand writing for the questionnaire. In this hand writing space 57, information concerning a competing company who provides the same type of service, or other comments can be made input.

After the input is completed by the customer, the customer presses a transmission button 56, so that the questionnaire result is sent to the service supporting server 10. On the other hand, if the customer wishes to cancel the input for the questionnaire, the customer should press a cancel button 58. This questionnaire window may be displayed by a Web browser, or may be displayed by another special application.

Figure 12:
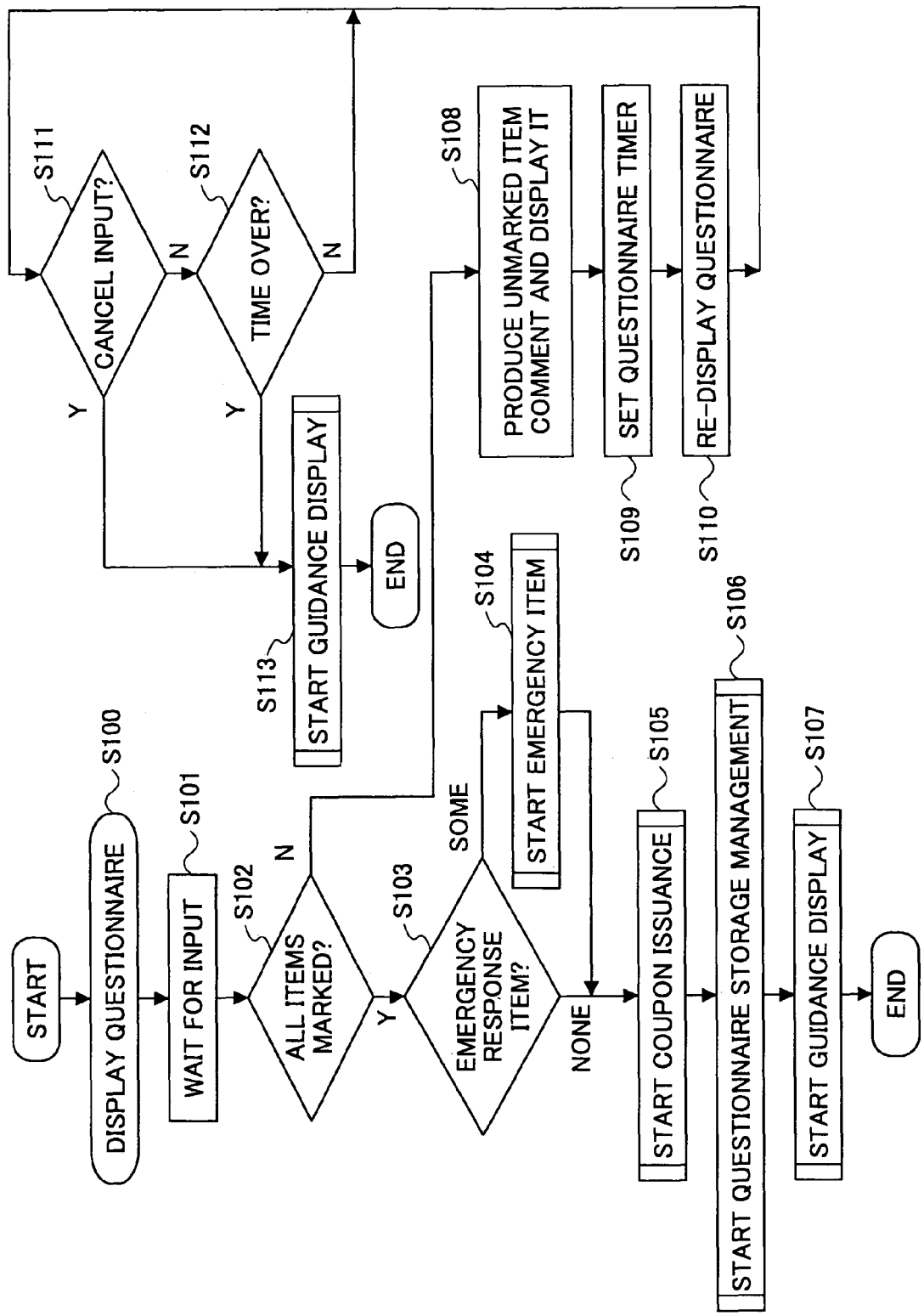
FIG. 12 shows a flowchart of processing concerning questionnaire input.

With reference to FIG. 12, the above-described processing will now be described in detail. This processing is executed by a program or a special application which operates on a Web browser, and the application which executes this processing will be referred to as a questionnaire input application, hereinafter.

In Step S100 corresponding to a questionnaire display step, a questionnaire is displayed. In Step S101, input by a customer therefor is waited for. When the customer makes input for the questionnaire and presses the transmission button, the questionnaire input application executes Step S102.

In Step S102, the questionnaire input application determines whether all the items of the questionnaire have been marked. When it is determined that all the items have been marked, the questionnaire input application transmits the input contents for the questionnaire to the service supporting server 10.

The service supporting server 10 determines in Step S103 corresponding to a questionnaire analysis step whether the emergency response items are marked therein. When the emergency response items are marked, the service supporting server 10 starts a program performing an emergency response (reporting to a relevant staff, as described later) in Step S104, and after this processing, performs processing of Step S105.

In case the emergency response items are not marked, the service supporting server 10 performs Step S105 corresponding to a service outputting step, starts the discount thicket issuance processing part 34, and thus, issues a discount ticket (as a reward for the input for the questionnaire) via the printer 12, or outputs the same in the form of barcode or character information to the portable terminal 16 of the customer. When the thus-output discount ticket is used together with the registration form of the same customer, it is possible to utilize the relevant information to manage/survey attributes of the user shown in FIG. 7.

In Step S106, then, the service supporting server 10 starts the questionnaire storage management processing part 32, and stores the questionnaire result in the questionnaire DB 38.

After this processing is finished, the service supporting server 10 starts the room guidance processing part 31, and makes the guidance display on the portable terminal 11.

Returning to Step S102, when the questionnaire input application determines that all the items have not been marked, the questionnaire input application produces unmarked item comments and displays the same for the purpose of showing to the customer which items have not been marked in Step S108. Then, the questionnaire input application sets a timer in Step S109. This timer is used for terminating the questionnaire input window being displayed continuously.

Then, in Step S110, the questionnaire input application re-displays the questioner. After that, the questionnaire input application starts a guidance display and finishes the processing in Step S111 when the cancel button 58 is pressed, or, in Step S112, the previously set timer completes its operation or the predetermined time has elapsed. On the other hand, when the cancel button 58 is not pressed and also the predetermined has not elapsed, the questionnaire input application continues to display the questionnaire window.

In the above-described processing, in order for a user to be able to easily make input for the questionnaire, a guidance message in a human voice may be output via the speaker shown in FIG. 2, or a configuration may be provided such as to accept voice input by the user.

Figure 13:
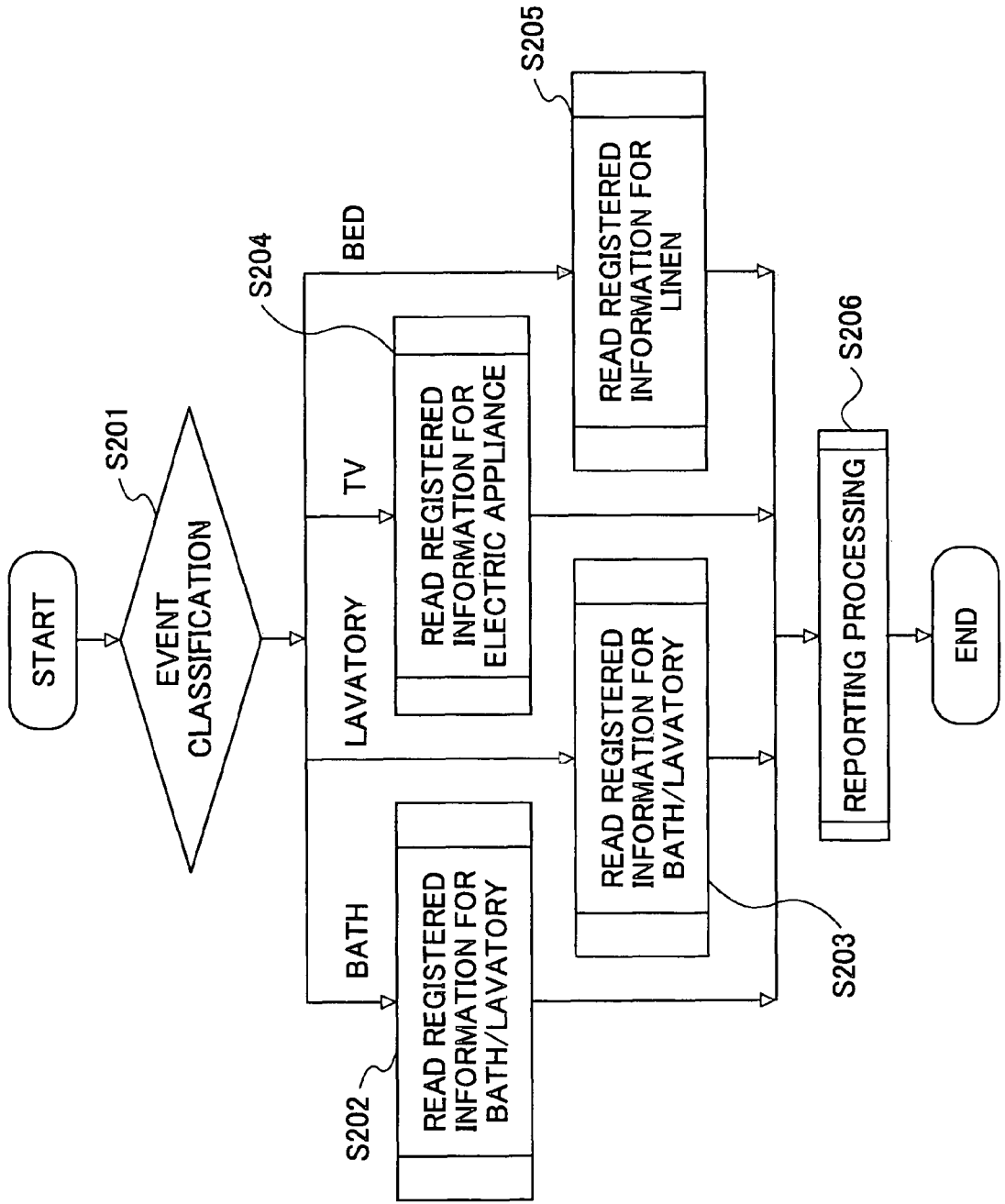
FIG. 13 shows a flowchart of processing of an emergency response processing part.

The above-described processing in Step S104 will now be described in detail with reference to FIG. 13. In Step S201, the emergency response processing part 36 selects processing according to the message received from the questionnaire analysis part 35.

When the bath has a failure according to the questionnaire result, the emergency response processing part 36 selects Step S202, and reads the registered information for the lavatory/bath staff in charge of lavatory/bath from the staff DB 41. Similarly, when the lavatory has a failure, the emergency response processing part 36 selects Step S203, and reads the registered information for the lavatory/bath staff in charge of lavatory/baths from the staff DB 41.

When a TV has a failure, the emergency response processing part 36 reads the registered information for the electric appliance staff in charge of electric appliances from the staff DB 41 in Step S204.

When the bed has a failure, the emergency response processing part 36 reads the registered information for the linen staff in charge of linen from the staff DB 41 in Step S205.

Thus, according to the contents of the failure, the extension number of the relevant staff is read, and the emergency response processing part 36 performs reporting processing in Step S206 with the extension number. Thus, the service supporting server 10 reports the matter of failure to the terminal of the staff who manages the facility having the failure.

Thus, according to the first embodiment, through a user questionnaire, a customer himself/herself is made to perform 'inspection work before execution of internal service of hotel businesses, for example, and then, a value/reward therefor can be paid for the customer in the form of a service charge discount.

Furthermore, according to the first embodiment, all the customers are made to report, at the end of receiving a service, a matter of failure if any to be repaired, by which a relevant problem can be prevented from being put to a subsequent customer, and thus rapid failure repair and improvement in the service operating rate are achieved.

Figure 14:
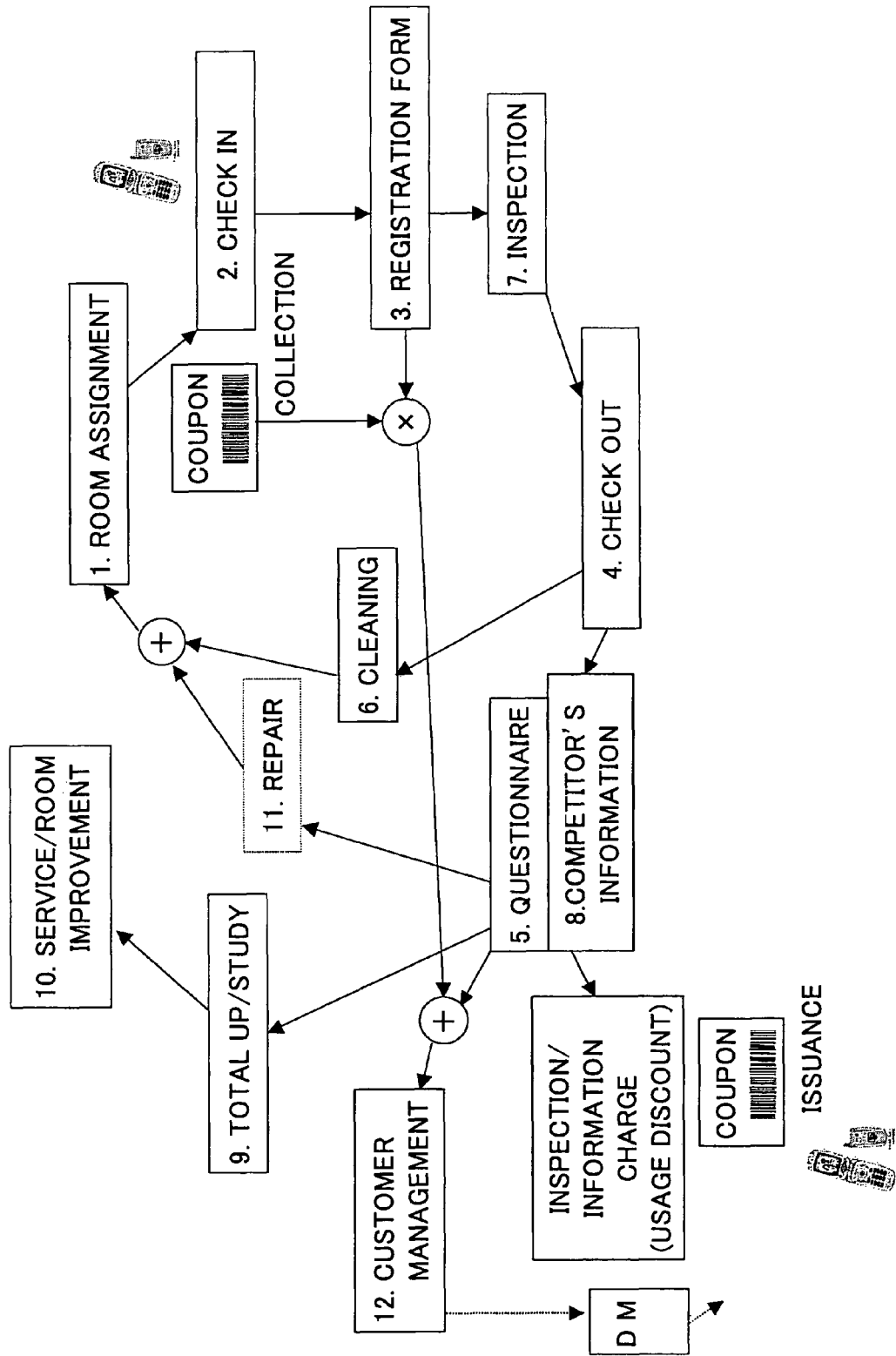
FIG. 14 shows a work flow in a first embodiment of the present invention.

FIG. 14 shows a work flow according to the first embodiment. In this work flow, as a result of a customer responding to a questionnaire interactively, evaluation of linen and cleaning quality, finding out about failure, and reporting thereof can be achieved, which otherwise should be performed by a special hotel staff in charge of inspection or so. Furthermore, collection of customers' preferences is also achieved. Furthermore, by utilization of a fact that a customer is a repeater who uses the hotel repetitively, service preference can be analyzed.

Furthermore, in the first embodiment, as to competing company information which is information concerning other parties which compete for the same contents of service, two methods may be applied: A first method is where the collected information is only stored, and then, batch summing up processing is performed therefor in a lump. A second method is a method in which, when input is made for competing company information, this matter is immediately displayed on a computer display device of a manager, or a staff portable terminal of a manager, and, depending on the input contents or depending on whether the relevant customer is eager enough to provide further information, the manager may directly contact the customer, and ask him/her for further details of the information.

The second embodiment of the present invention will now be described with reference to the above-described first embodiment. Descriptions of the configurations having the reference numerals same as those in the first embodiment are omitted unless there is a special necessity.

The entire configuration of the second embodiment is same as that of the first embodiment shown in FIG. 1 except that hardware configurations of the service supporting server 10, customer terminal 11 and front terminal 13 are different from those in the first embodiment, which will now be described with reference to FIG. 15. All the devices/parts shown in FIG. 15 should not be necessarily provided in each of the service supporting server 10, customer terminal 11 and front terminal 13, and the respective devices/parts should be provided as necessary.

Figure 15:
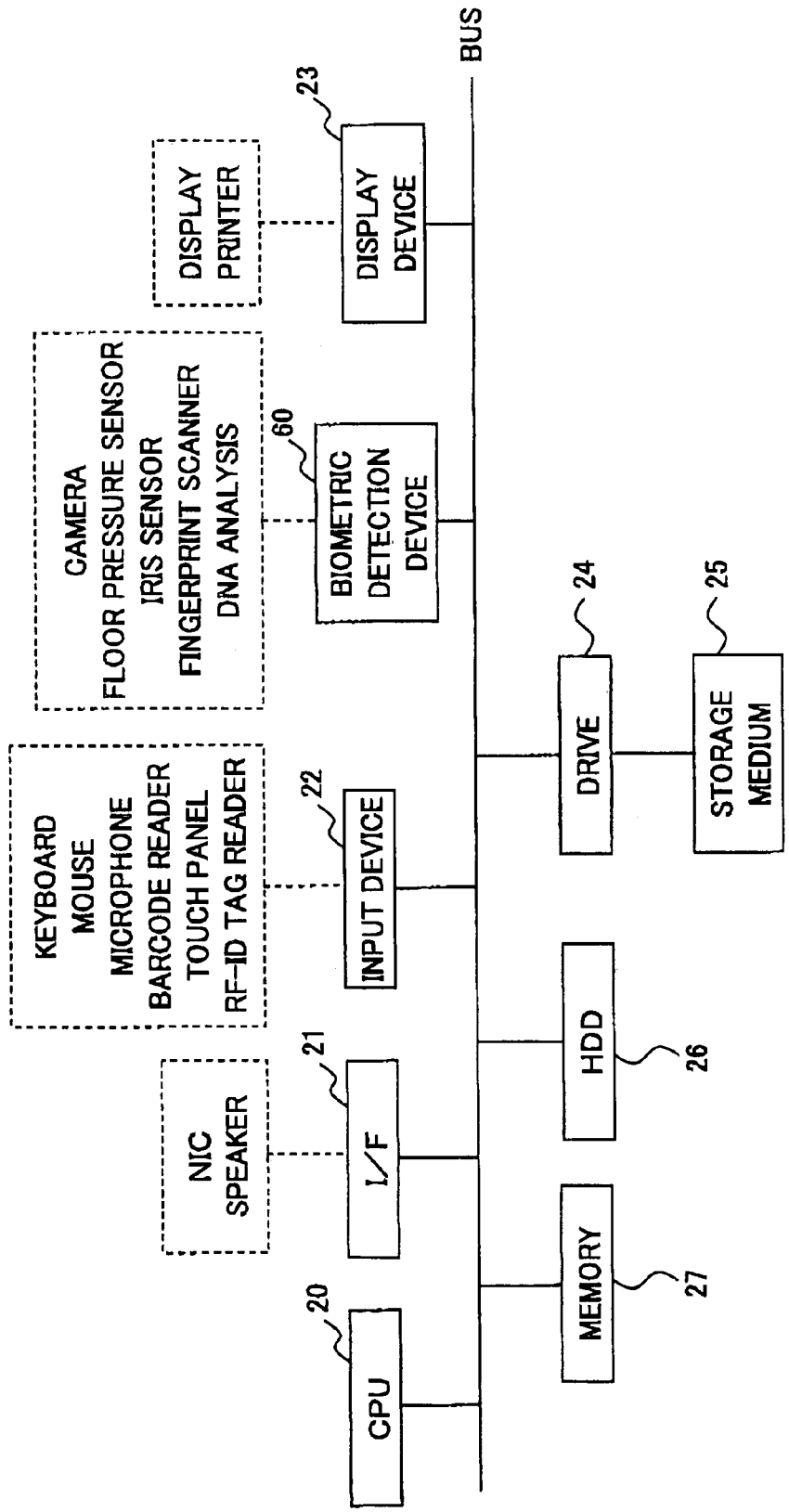
FIG. 15 shows a hardware configuration.

As shown in FIG. 15, an RF-ID tag reader and a biometric detection device 60 are added in the input device 22. The RF-ID tag reader reads information stored in a tag put to a room key as will be described later.

The biometric detection device 60 acting as a biometric characteristic extraction part includes at least one of a camera, a floor pressure sensor, an iris code sensor, a fingerprint scanner, and a DNA analyzer. Any of these is used for extracting biometric characteristics of a customer, so as to identify the customer. Hereinafter, term 'detection', 'measurement' or so is used depending on a target to treat, other than the term 'extraction'.

Thereamong, the camera is used for detecting a facial feature or the body height of the customer. Detection of the body height is performed with the use of a technique well-known in the art disclosed by the above-mentioned patent document #5, for example. In this case, it is preferable that the camera be disposed on the backside or a lateral side of the customer.

As to the facial feature of the customer, a face image taken of a customer's face by the camera is made to undergo digitization processing, a facial feature is thus analyzed, and the facial feature is detected. This camera is preferably disposed in front of the customer. The above-mentioned facial feature is data of a raw picture of the entirety of the customer's front face obtained from the image of the customer taken by the camera in a condition in which the customer is unconscious, then the image data is caused to undergo framing processing, the background thereof being removed for obtaining the above-mentioned facial feature data. Furthermore, data of a raw picture of the entire side face of the customer may be added such that the nose height can be determined. These data are preferably monochrome images rather than color images in terms of pickup device characteristics and data size.

Furthermore, the gender of the customer may be determined according to a technique well-known in the art disclosed by the above-mentioned patent document #7, for example.

The floor pressure sensor is used for detecting the stride of the customer or detecting that the customer approaches terminal 11 via which the customer makes input for the questionnaire The iris code sensor performs customer identification by the following processing: First, a digital still camera which is fixed is used for taking a picture of the entire image of an upper half body of the customer in a condition in which the customer stands at a position in front of the front desk. Then, from the thus-taken picture, an iris part is extracted through framing processing, and thus, data of a raw picture of the iris code is obtained. After that, customer identification is achieved through pattern matching and color spectrum comparison between reference iris code raw picture data and the currently obtained image data.

The fingerprint scanner is disposed below the reception counter provided with a panel through which the fingerprint scanner causes detection light to transmit therethrough so as to take a fingerprint image of the customer who stands in front of the reception counter. The thus-obtained fingerprint image is caused to undergo framing processing, and then, the background is removed therefrom, in the same manner as for the case of facial feature detection described above.

The DNA analysis is performed as follows: The customer provides a hair, saliva, nail, or blood, which is then processed by a DNA analyzer. As a result, a predetermined spectrum is obtained. After that, in a same manner as that for voiceprint analysis, a pattern matching technique is applied, and thus, customer identification is achieved.

Although not shown, in case where a voiceprint is applied as the biometric characteristic to identify the customer, voice is recorded via a microphone when the customer who makes a reservation declares his/her own name. The thus-recorded voice is used as a voice phrase. Then, the background noise is removed therefrom. Then, words such as 'reservation', 'check in', 'please' and so forth, produced by the customer for the reservation declaration, are extracted Then a tag is put for each word, and, the thus obtained voice data is stored in the customer DB as recorded raw voice data. At a time of actual customer identification, pattern matching is performed between the stored recorded raw voice data and the current recorded raw voice data with respect to frequency spectrum and voice pitch.

Other than the above-described biometric detection device 60, a printer is provided in the display device 23 which is used for printing the hotel register described later.

Figure 16:
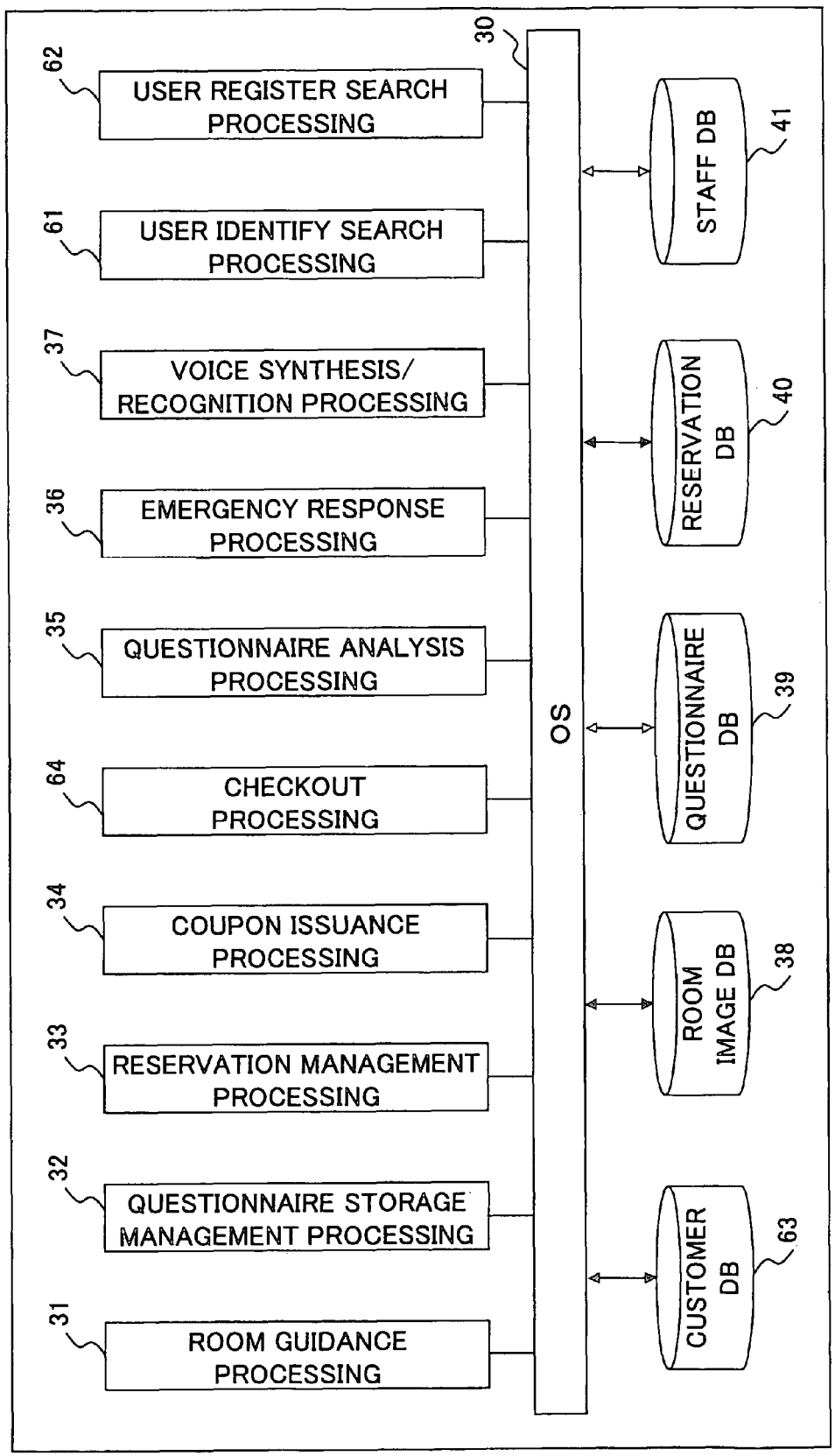
FIG. 16 shows a software block diagram.

With reference to FIG. 16, a software configuration of the service supporting server 10 according to the second embodiment will now be described. In this software configuration, a user identify search processing part 61 and a user register search processing part 62 are added to the software configuration of the first embodiment described above with reference to FIG. 3. Furthermore, a customer DB 63 is added.

The user identify search processing part 61 acting as a part of searching for customer's biometric characteristic from a customer DB searches the customer DB 63 for identifying the customer. The user register search processing part 62 searches the customer DB 63 in case the customer is already registered in the customer DB 63, or registers the customer in the customer DB 63 in a case the customer is not registered there yet, when the customer checks in.

Figure 17:
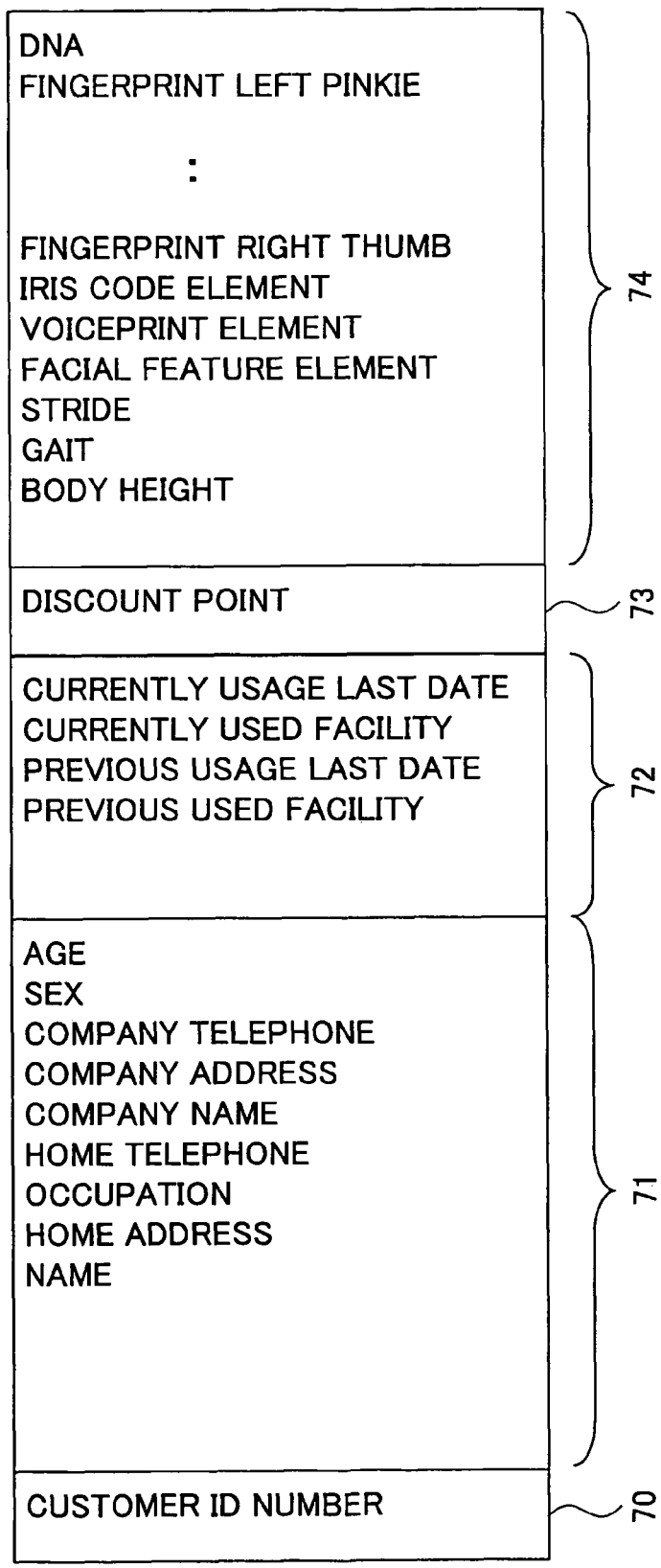
FIG. 17 shows a customer DB.

The customer DB 63 is a database used for managing customers. This customer DB 63 will now be described with reference to FIG. 17. The customer DB 63 includes a customer ID number 70, personal information 71, facility usage information 72, a discount point 73, and biometric information 74 for each customer.

The ID number 7 is used for a key of the database. The personal information 71 includes general information such as name, home address, occupation, home telephone, company name, company address, company telephone, gender and age.

The facility usage information 72 includes a previously used facility, a previous usage last date, a currently used facility and a current usage start date. The previously used facility is a facility used before the current facility being used. The previous usage last date is the date at which the usage of the previously used facility was finished. The currently used facility is a facility currently being used. The current usage start date is a date at which the usage of the currently used facility started.

The discount point 73 corresponds to the discount ticket in the above-described first embodiment. The biometric information 74 includes the body height, a stride, a gait, a facial feature element, a voiceprint element, an iris code element, a right thumb fingerprint, a left pinkie fingerprint, DNA and so forth. The information is obtained by the respective sensors described above, and is recorded in the customer DB 63 for the purpose of customer identification.

Figure 18:
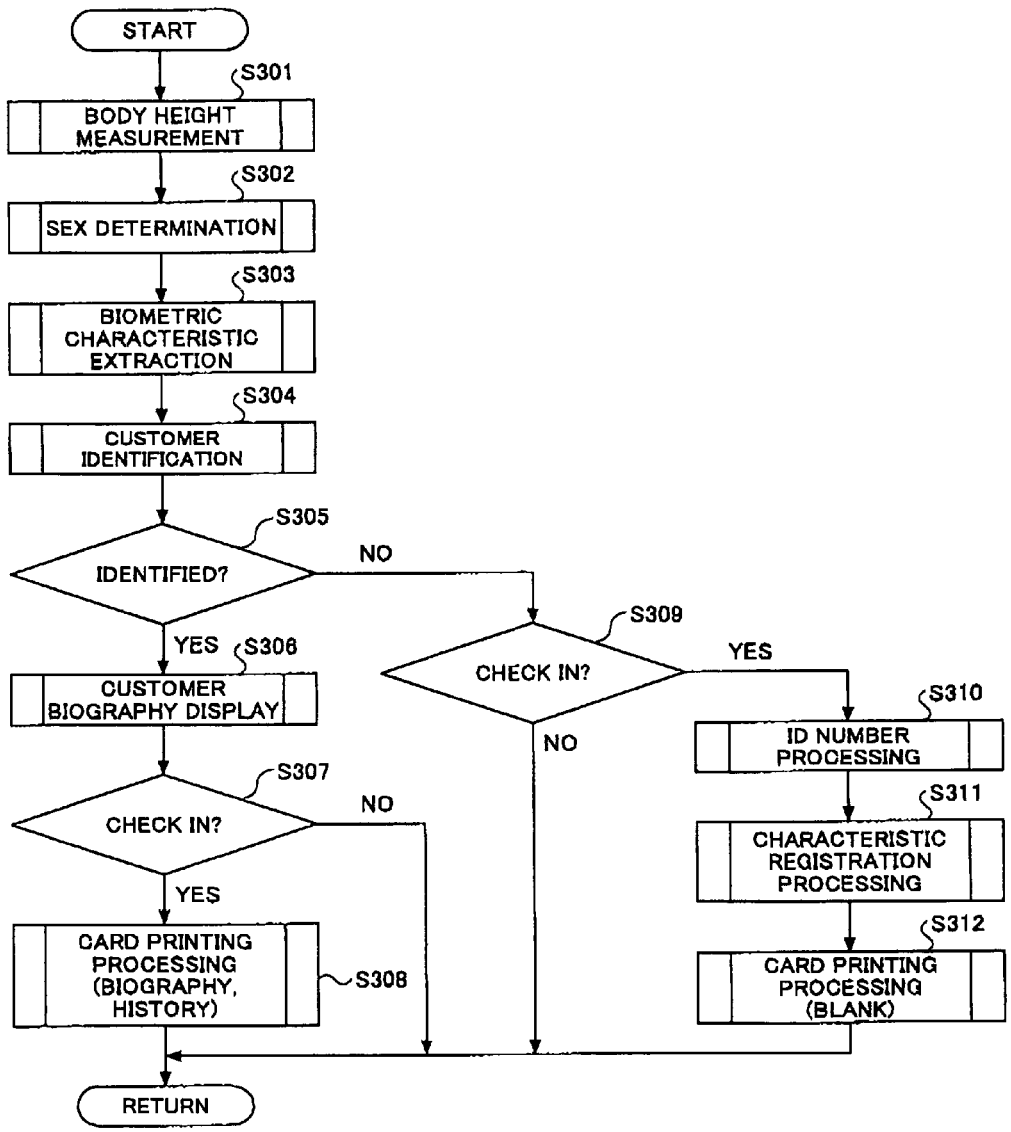
FIG. 18 shows a flowchart of user registration search processing.

Actual processing of the second embodiment will now be described. First, processing performed by the user register search processing part 62 performed when a customer checks in will now be described with reference to FIG. 18.

In Step S301, the body height of the customer is measured. In Step S302, the gender of the customer is determined. In Step S303, biometric characteristics are extracted. In Step S304, the customer is identified. As for the specific details of these steps, please see the relevant descriptions above.

In Step S305, it is determined whether the customer identification has succeeded. If the identification has failed, Step S309 is performed. If the identification has succeeded, a biography is displayed in Step S306 accordingly. The biography is information recorded in the customer DB 63.

In Step S307, it is determined whether the customer has checked in. If the customer has not checked in, the processing is finished. If the customer has checked in, card printing is performed in Step S308. A card printed in this case is a general hotel register, and in the case of Step S308, as the customer has been already identified in this case, the printing is performed based on the relevant biography and history stored. This card will be described later. At this time, it is also possible that the customer's usage history is displayed or printed.

Returning to the processing in Step S305, if the identification has failed in Step S305, it is determined whether the customer has checked in. If the customer has not checked in, the processing is finished.

In case of checking in, the customer should be a new user in this case, and thus in Step S310, ID number processing is performed. This processing is to assign an ID number. First, in Step S311, characteristics of this customer, such as the body height, gender and biometric information, obtained as described above, are registered.

After this registration is finished, in Step S312, card printing is performed. In this case, no information such as an address of the customer is recorded in the customer DB 63 yet. Accordingly, the card is blank. In case of printing the card, it is also possible that it is determined whether the customer's usage history shows where the customer stayed the previously day, and only in the case, 'previously stayed place' is printed out on the card.

Furthermore, in a case where the customer DB is mounted in the service supporting server, the above-mentioned processing related to the customer DB is performed with communications with the service supporting server.

Figure 19:
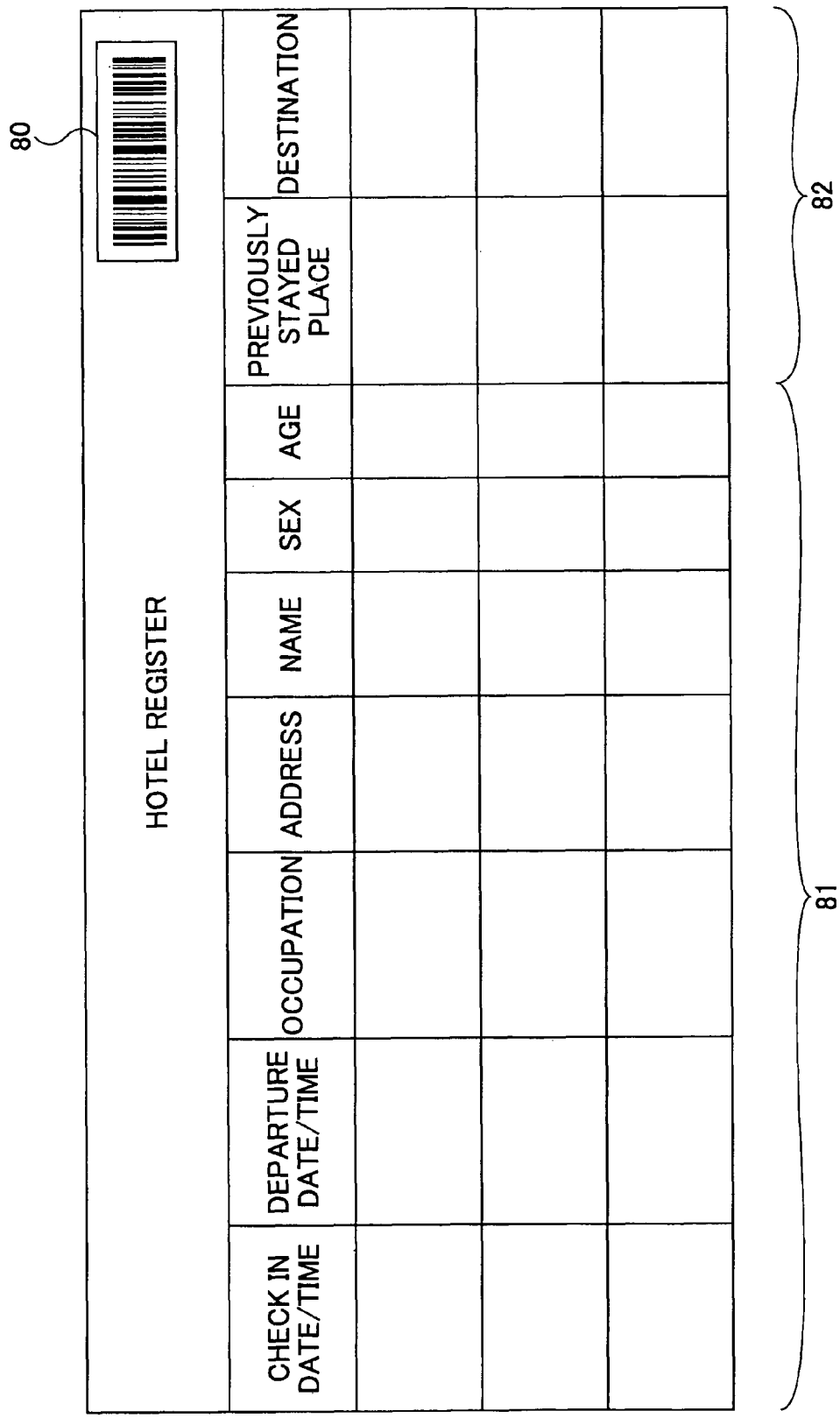
FIG. 19 shows a hotel register.

With reference to FIG. 19, the card printed in the above-mentioned processing will now be described assuming that the card is a hotel register. The hotel register includes items of a biography 81, a previously stayed place 82, and a barcode 80, as shown. The biography includes items of check-in date/time, departure date/time, occupation, address, name, gender, and age. The previously stayed place 82 includes items of previously stayed place and destination.

The barcode 80 denotes the customer ID. For the new customer, a newly assigned barcode is printed while, for the customer already registered, an already assigned barcode is printed.

The customer executes a signature in the signature space of the hotel register, and receives a room key from a reception staff member. The reception staff member then inputs the biography the customer supplied on the card, on the keyboard of the terminal, causes the barcode reader to read the barcode of the hotel register, and transmits a request to the service supporting server 10 such as to cause the server 10 to additionally record the customer information temporarily stored.

The service supporting server adds 'currently used facility' and 'usage date' automatically other than the customer information, the recording of which has been requested, and thus the registration for the new customer is completed.

Thus, processing concerning check-in is performed. In a room key which the customer receives upon checking in, a passive RF-ID chip tag which is used when input is made for a questionnaire is incorporated. By this passive RF-ID chip tag, the room where the customer stays can be identified.

Figure 20:
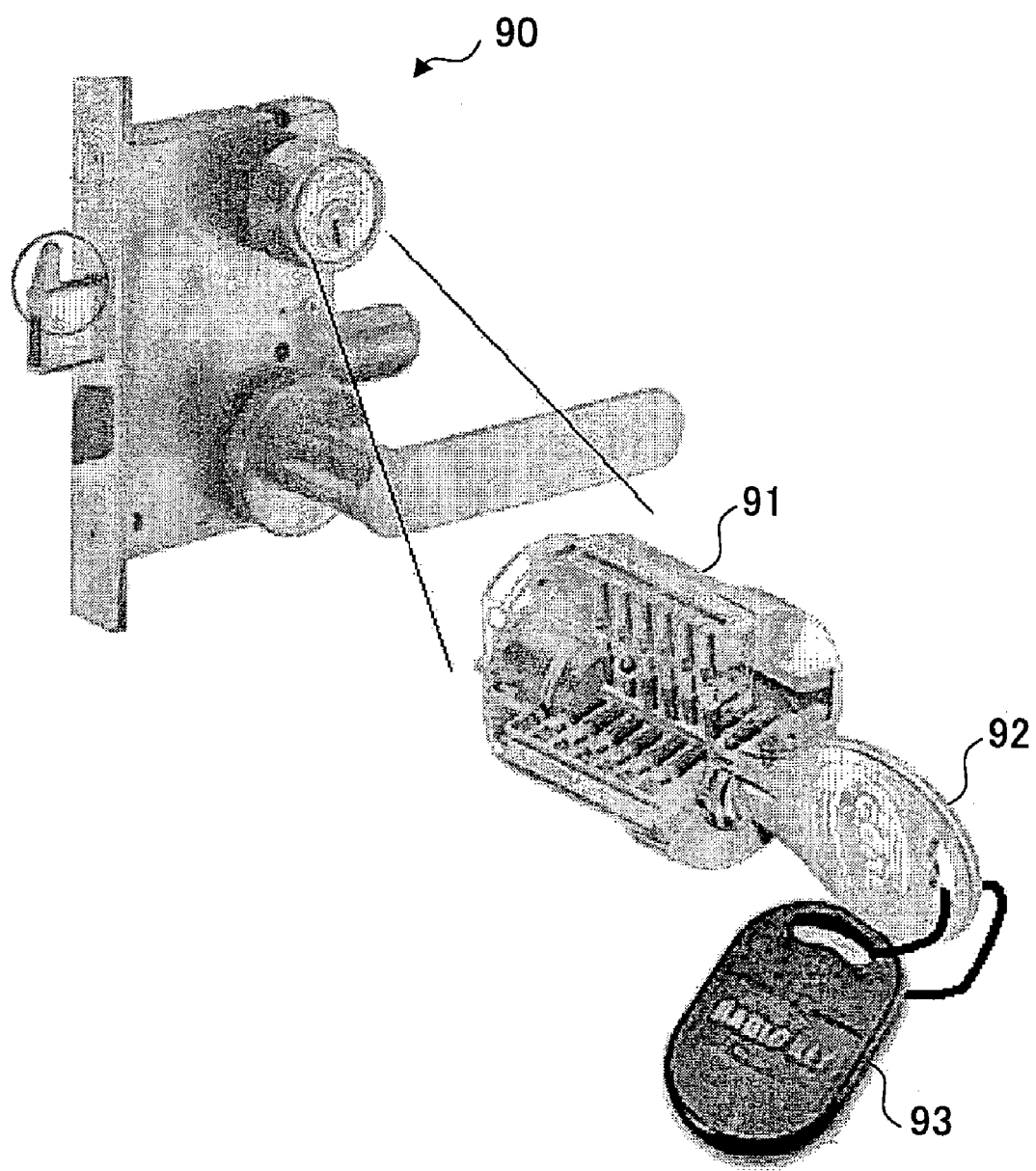
FIG. 20 shows a cylinder lock and a key with a tag including a passive RF-ID chip.

As an example of this key, a key-holder-type key and a card-type key will now be described. First, the key-holder-type key will now be described. A key lock shown in FIG. 20 is a cylinder key lock, to a key of which the passive RF-ID chip tag is attached in the form of a key holder. In FIG. 20, a cylinder-type key-lock device 90, a cylinder 91 (magnified) included therein, the key 92 and the passive RF-ID chip tag 93 in the form of key holder are shown.

Figure 21:
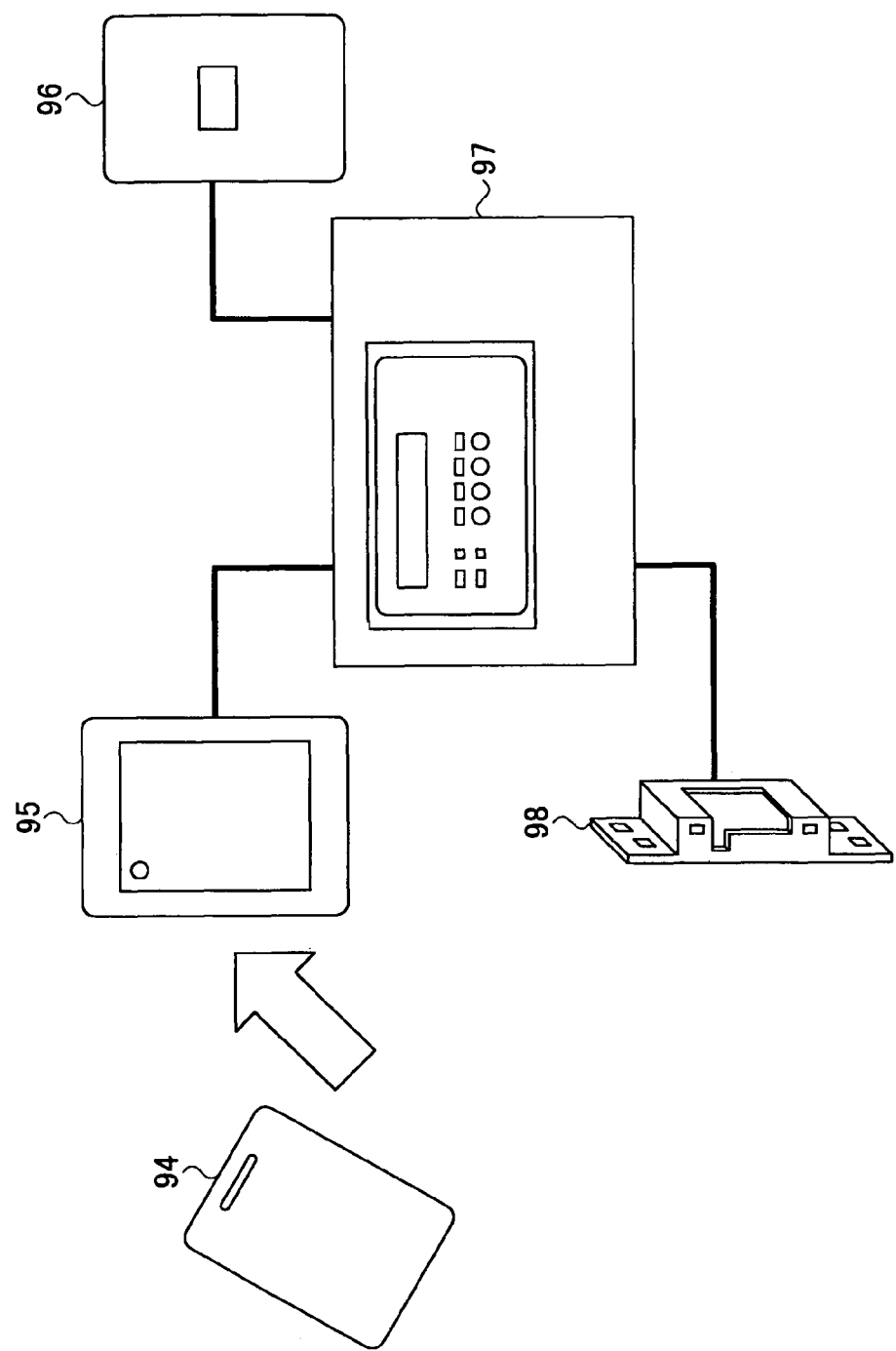
FIG. 21 shows an electronic lock system and a card including a passive RF-ID chip.

With reference to FIG. 21, the card-type key will now be described. FIG. 21 shows a card key 94, a card reader 95, an exit switch 96, an electronic lock 98, and a controller 97.

The card key 94 has a passive RF-ID chip tag incorporated therein. The exit switch 96 is a switch used when a person exits the hotel room. The electronic lock 98 is a lock operated responsive to instructions given by the controller 97. The controller 95 controls the exit switch 96, card reader 95 and electric lock 98.

By incorporating the passive RF-ID chip tag in the key, it is possible to identify the room where the customer stays.

Processing performed by the customer terminal to identify a customer when the customer makes input for a questionnaire will now be described with reference to FIG. 22. This processing can be applied not only for a case where the customer has a room key described above but also for a case where the customer does not have the room key. Accordingly, the processing can be applied even for a case where the customer has finished checking out.

In Step S401, a timer for identifying a customer is set. At this time, on the screen, a window to urge the customer to show a room key is displayed, or the same request is made via voice. Then, in Step S402, it is determined which one of three types of processing is selected for identifying the customer.

In case of using a key described above for identifying the customer, key identification is performed in Step S403. As described above, the key of the customer includes the RF-ID chip tag which is a medium storing the customer's authentication (or identification) electronic data as described above with reference to FIGS. 20 and 21. With a use thereof, the customer is authenticated or identified. Then, in Step S404, the customer ID obtained from the identification is used for searching the customer DB. Then, in Step S411, a questionnaire is displayed. At this time, a message 'Mr. XXXX, your (used) room is A6' or so is delayed in the window.

Returning to the processing of Step S402, when the customer speaks 'don't have' meaning that the customer does not have a room key, the customer's voice is detected by the microphone of the customer terminal, is recognized by a technique well-known in the art, and then, detection for biometric characteristics of the customer is started. Instead of the voice of 'don't have' of the customer, a gesture command disclosed in FIGS. 34 through 36 of Japanese Laid-Open Patent Application No. 2002-271763 may be used.

In Step S402, when the customer does not have the room key, detection for biometric characteristics is performed as mentioned above in Step S405. From the thus-detected biometric characteristics, customer identification is performed in S406. In Step S407, when the identification has succeeded, the questionnaire is displayed in Step S411. If the identification has failed, a guidance message is displayed in Step S408. This guidance message is a message for causing the customer to move to a position such that biometric characteristics can be positively detected for the second trial of the detection. As an example of this guidance message, 'speak "questionnaire" toward a green lamp', or so on a display screen or via voice is provided. After that the processing of Step S402 is performed again.

Returning to the processing of Step S402, when the customer does not show a room key and also, no speech of 'nothing' is made, the timer finishes its operation or the predetermined time has elapsed in Step S409. In this case, processing for displaying an apology is started in Step S410, for example, a display is made such as 'excuse me, we cannot identify you', or so. Then the processing is finished.

The window shown in FIG. 23 for questionnaire is applied in the above-mentioned processing. Different from the window in the first embodiment shown in FIG. 11, instead of request to the customer for inputting a room number, the room number is automatically displayed there as the customer has been already identified automatically in the second embodiment. Furthermore, a message urging the customer to show a room key, and a message urging the customer to make a voice of 'don't have' are added there. Furthermore, a button 102 for 'express checkout' is provided, which will be described later.

Figure 24A:
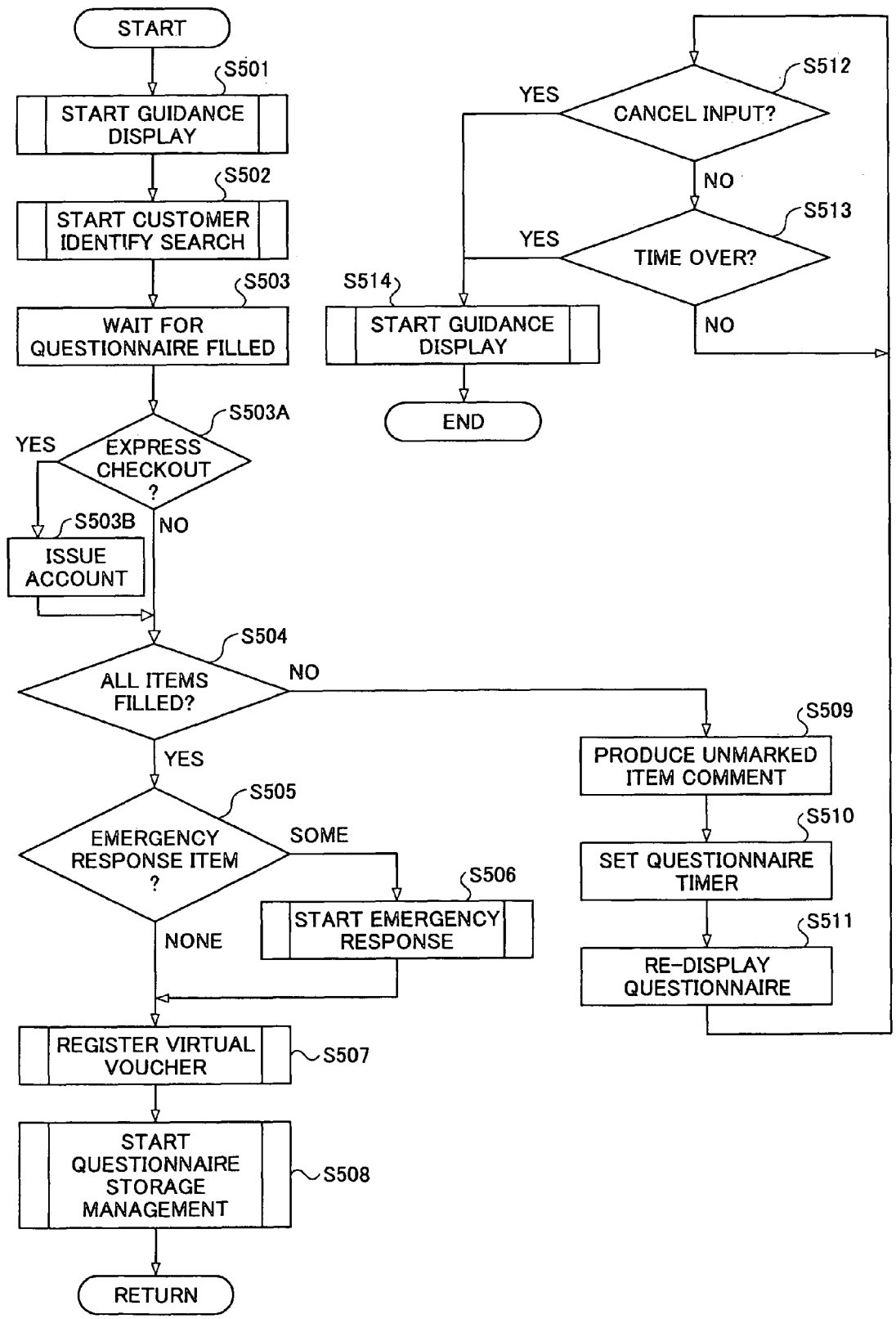
FIG. 24A shows a flowchart of processing concerning questionnaire input.

With reference to FIG. 24A, processing concerning the questionnaire input in the second embodiment will now be described. In Step S501, a predetermined guidance message is displayed for identifying the customer. At this time, the approach of the customer may be detected by the floor pressure sensor, for example.

Then, in Step S502, the processing of identifying the customer described above with reference to FIG. 22 is started. In this processing, the questionnaire is displayed first. Then, in Step S503, input for the questionnaire is waited for. After the customer makes input for the questionnaire, and presses the transmission button, Step S503A is performed. The processing concerning Steps S503A and S503B will be described later. After that, the questionnaire input application performs Step S504.

Then, in Step S504, the questionnaire input application determines whether all the items have been marked. When it is determined that all the items have been marked, the questionnaire input application transmits the input results for the questionnaire to the service supporting server 10.

In Step S505, the service supporting application 10 determines whether the emergency response items are marked. When the emergency response items are marked, the service supporting server 10 starts a program performing emergency response in Step S506, and then after this processing is finished, the service supporting server 10 performs Step S507.

When the emergency response items are not marked, the service supporting server 10 performs Step S507, starts the discount ticket issuance processing part 34, and registers a virtual voucher.

Then, in Step S508 the service supporting server 10 starts the questionnaire storage management processing part 32, and stores the questionnaire result in the questionnaire DB 38.

Returning to the selection processing in Step S504, when the questionnaire input application determines that all the items have not been marked, the questionnaire input application produces unmarked item comments for notifying of the customer the unmarked items in Step S509, and displays the same. Then, the questionnaire input application sets a timer in Step S510. This timer is used for terminating the continuous display of the questionnaire window.

In Step S511, the questionnaire input application re-displays the questionnaire window. After that, the questionnaire input application determines in Step S512 whether the cancel button 58 is pressed or determines in Step S513 whether the timer set previously has finished its operation or the predetermined time has elapsed, displays a guidance message in Step S514 if any of these is determined to be affirmative, and finishes the processing. Until the cancel button 58 is pressed or the timer finishes its operation, the questionnaire input application continues the display of the questionnaire window.

Figure 25:
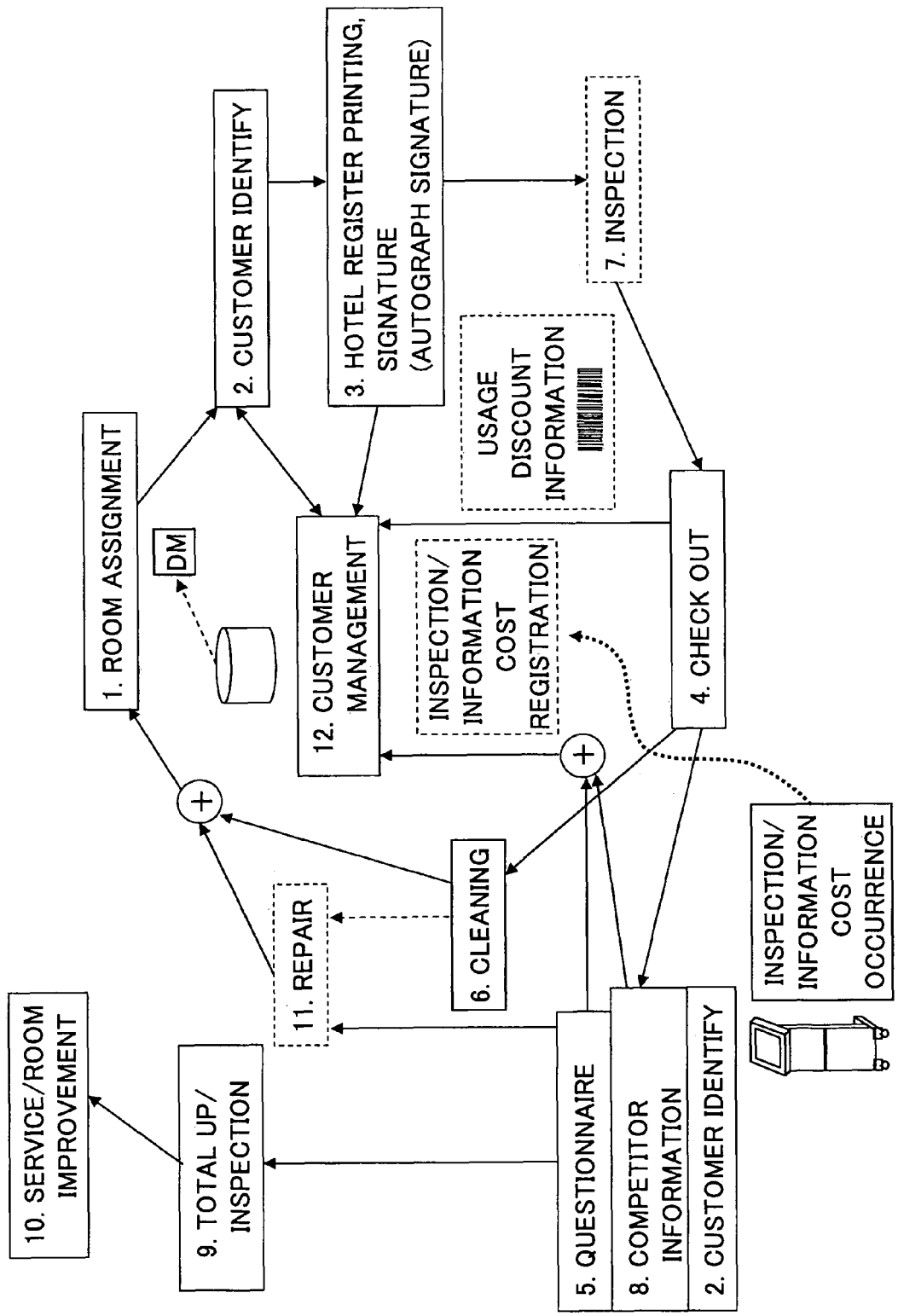
FIG. 25 shows a work flow in a second embodiment of the present invention.
Figure 26:
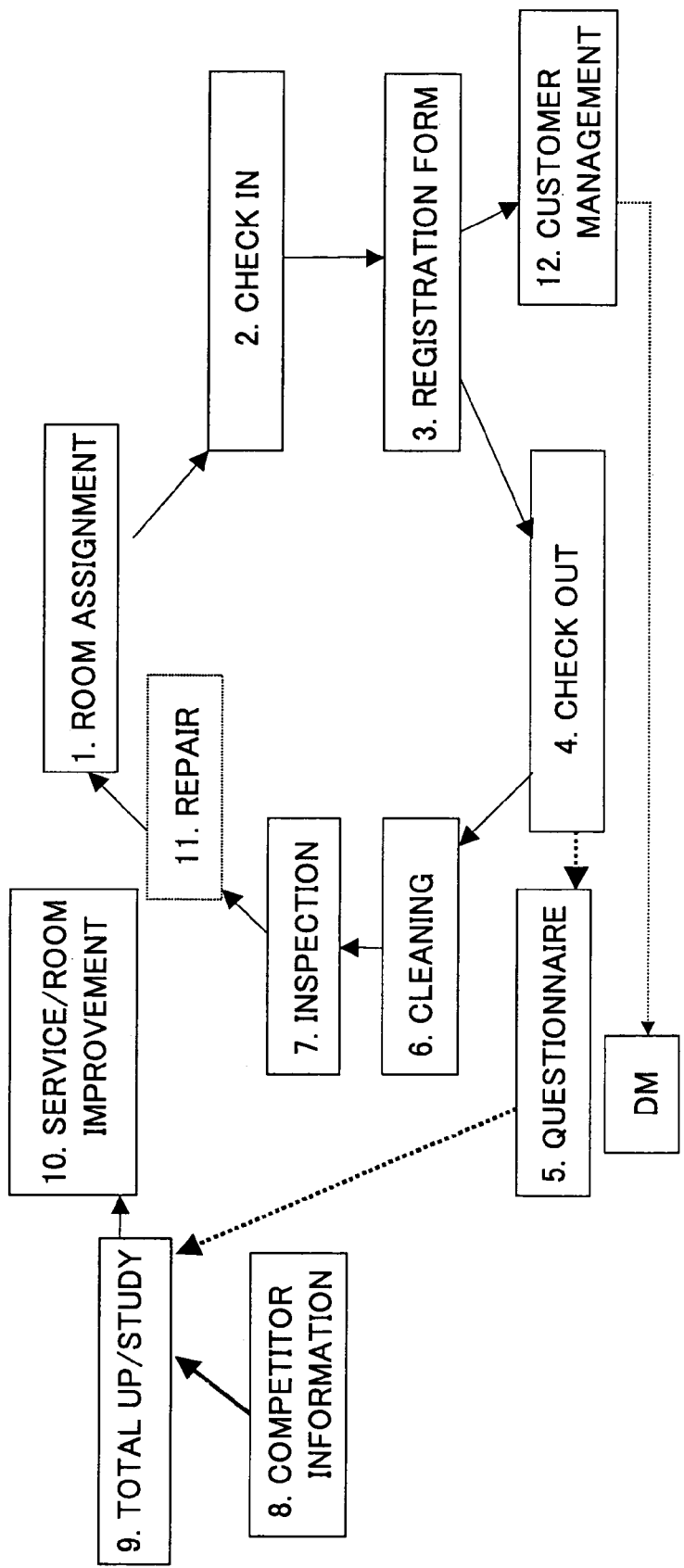
FIG. 26 shows a work flow in a relate art case.

FIG. 25 shows a work flow according to the second embodiment. In this work flow, in addition to that according to the first embodiment, customer identification is enabled. Thereby, printing of the hotel register can be performed with customer information already included therein, and also, it is possible to prevent erroneous input of room number by a customer.

Furthermore, as in the first embodiment, as the service quality maintenance costs in a service business are shared with users (as a result of the users being made to help the hotel business in the form of answering the questionnaires), the total costs can be reduced. Furthermore, in a service business, especially in a hotel business, reception operations can be performed rapidly. Furthermore, a customer should not carry a 'customer card' or so used for receiving discount service for the repeater. Furthermore, it becomes possible to improve the efficiency of security operations by means of positive customer identification.

The above-mentioned service supporting server 10 has a function for allowing a customer to make a so-called 'express checkout'.

For this purpose, as shown in FIG. 16, the service supporting server 10 includes a checkout processing part 64, and also, as shown in FIG. 23, the questionnaire window includes the above-mentioned button 102 of 'express checkout'. This function for allowing the customer to make express checkout performed by the above-mentioned checkout processing part 64 will now be described.

Figure 24B:
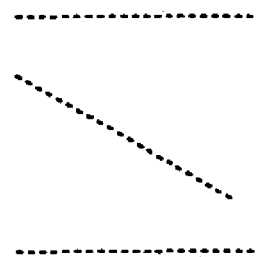
FIG. 24B shows an example of a hotel account.

Upon finishing the usage of the hotel in this example, the customer goes to the service customer terminal 11 provided near the front desk or another place in the hotel. Then, returning to FIG. 24A, after Steps S501, S502 and S503 are performed as described above, it is determined whether the above-mentioned express checkout button 102 is clicked by the customer in Step S503A. If the button 102 is not clicked, Step S504 is performed. However, if the button 102 is clicked, this means that the customer wishes predetermined express checkout processing. At this time, in Step S503B, the service supporting server 10 prints out a hotel account, as shown in FIG. 24B, for the customer.

Then, the customer should perform a predetermined process such as to make a signature on the hotel account sheet and then drop the sheet in a predetermined return box provided beside the front desk together with the key contained in a predetermined envelope, for example. Thereby the customer is allowed to quickly exit the hotel without performing any other ordinary checkout process, for example, to pay money, to give his/her credit card to a hotel staff member at the front desk, or the like. The actual payment will be made separately a the credit card.

The above-mentioned predetermined process may be performed instead in the following manner as another example: At the time of reception at the hotel, the customer requests the reception desk to make 'express checkout'. Then, at the time of checkout, a hotel account is printed out, and if the customer has no problem with the contents of the account, the customer should only drop the key in the return box without signing the printout.

Further, the present invention is not limited to the above-described embodiments, and variations and modifications may be made without departing from the basic concepts of the present invention as claimed.

The present application is based on Japanese Priority Applications Nos. 2002-381082 and 2003-367406, filed on Dec. 27, 2002 and Oct. 28, 2003, respectively, the entire contents of which are hereby incorporated herein by reference.

What is claimed is:

1. A service supporting system comprising a service supporting server supporting a service operation for a customer, a reception terminal communicatable with said service supporting server and receiving terminals for receiving emergency responses, wherein said reception terminal comprises:

a part extracting biometric characteristics of the customer;

a display part displaying a questionnaire concerning the service operation with the questionnaire containing questions relative to basic items in connection with the service operation and items selected from a list of items comprising: "room clean"; "bathroom clean"; "lavatory clean"; "lightings blown"; "bed clean"; "corridor clean" and emergency response items having numbers associated therewith for contacting the proper receiving terminal associated with each of the listed items;

an inputting part causing the customer to input for the questionnaire;

a questionnaire transmission part transmitting the biometric characteristics and the input questionnaire result to said service supporting server with said service supporting server comprising a part searching a customer database for the received customer's biometric characteristics;

a questionnaire analysis part analyzing the questionnaire result to determine if an equipment failure exists in one or more of the emergency response items in the questionnaire, a determining part for further determining, without human interaction or participation, if the equipment failure requires an emergency response, an emergency response processing part, and a transmitting part for automatically transmitting a message from the determining part to the emergency response processing part when an equipment failure requiring an emergency response has been identified including contents of the failure wherein the emergency response processing part has a selecting part for automatically selecting a number from the emergency response items for contacting the proper receiving terminal associated with the selected number in response to the identification of an emergency and a reading part for reading registered information to the proper receiving terminal associated with the failed equipment, such that:

when a failure in the bath occurs according to the questionnaire result, the emergency response processing part reads registered information related to the receiving terminal associated with the bath; when a failure in the lavatory occurs according to the questionnaire result the emergency response part reads registered information related to the receiving terminal associated with the lavatory; when a TV has a failure according to the questionnaire result, the emergency response processing part reads registered information related to the receiving terminal associated with electric appliances; and when a bed has a failure according to the questionnaire result, the emergency response processing part reads registered information related to the receiving terminal associated with a bed and includes a reporting part for reporting to the receiving terminal associated with the equipment using the registered information read by the reading part, and for transmitting information of a failure in equipment to the proper terminal associated with the equipment experiencing the failure.

2. The service supporting system as claimed in claim 1, wherein said reception terminal further comprises:
  a part detecting a medium being used by or on behalf of the customer in a hotel for detecting stored usage authentication electronic data of the customer;
  a part detecting an intention of the customer to finish usage of the hotel; and
  a usage account statement printed out for the customer.

3. A service supporting system comprising a service supporting server supporting a service operation for a customer, a reception terminal communicatable with said service supporting server and receiving terminals for receiving emergency responses, wherein said reception terminal comprises:
  a part extracting biometric characteristics of the customer;
  a part for inputting a biography which is information concerning the customer and declared by the customer; and
  a part transmitting the biometric characteristics and the input biography to said service supporting server; and a questionnaire to be filled in by the customer, containing questions relative to basic items in connection with the service operation and items selected from a list of items comprising: "room clean"; "bathroom clean"; "lavatory clean"; "lightings blown"; "bed clean"; "corridor clean" and emergency response items having numbers associated therewith for contacting the proper receiving terminal associated with each of the listed items;
  a part searching a customer database for the received customer's biometric characteristics;
  a questionnaire analysis part analyzing the questionnaire result to determine if an equipment failure exists in one or more of the emergency response items in the questionnaire,
  a determining part for further determining, without human interaction or participation, if the equipment failure requires an emergency response,
  an emergency response processing part, and
  a transmitting part for automatically transmitting a message from the determining part to the emergency response processing part when an equipment failure requiring an emergency response has been identified including contents of the failure and
  wherein the emergency response processing part has a selecting part for automatically selecting a number from the emergency response items for contacting the proper receiving terminal associated with the selected number in response to the identification of an emergency and a reading part for reading registered information to the proper receiving terminal associated with the failed equipment, such that:
  when a failure in the bath occurs according to the questionnaire result, the emergency response processing part reads registered information related to the receiving terminal associated with the bath; when a failure in the lavatory occurs according to the questionnaire result the emergency response part reads registered information related to the receiving terminal associated with the lavatory; when a TV has a failure according to the questionnaire result, the emergency response processing part reads registered information related to the receiving terminal associated with; and when a bed has a failure according to the questionnaire result, the emergency response processing part reads registered information related to the receiving terminal associated with a bed and includes a reporting part for reporting to the receiving terminal associated with the equipment using the registered information read by the reading part, and for transmitting information of a failure in equipment to the proper terminal associated with the equipment experiencing the failure.

4. The service supporting system as claimed in claim 3, comprising a part displaying or printing the customer's biography.

5. The service supporting system as claimed in claim 4, comprising a part displaying or printing a service usage history of the customer.

6. The service supporting system as claimed in claim 4, wherein the customer's biometric characteristics comprise at least one of a facial features, a fingerprint, an iris code, a voiceprint, a body height, a gait and a DNA code.

7. The service supporting system as claimed in claim 3, wherein said reception terminal further comprises:
  a part detecting a medium being used by or on behalf of the customer in a hotel for detecting stored usage authentication electronic data of the customer;
  a part detecting an intention of the customer to finish usage of the hotel; and
  a usage account statement printed out for the customer.

8. A service supporting system comprising:
  a reception terminal that communicates with a service supporting server that supports a service operation for a hotel customer, said reception terminal comprising:
  a biometric extraction part that extracts at least one biometric characteristic of the hotel customer, wherein the at least one extracted biometric characteristic comprises at least one of a facial feature, a fingerprint, an iris code, a voiceprint, a body height, a gait, and a DNA code;
  a customer identification recording part that records customer identification information on a medium lent to the hotel customer based on the at least one extracted biometric characteristic, wherein said medium comprises an RF-ID chip;
  a hotel room recording part that records a hotel room number associated with the hotel customer on the medium lent to the hotel customer;
  a medium detection part that detects the medium lent to the hotel customer and extracts the recorded customer identification information and the recorded hotel room number from the medium;
  a questionnaire displaying part that displays a questionnaire to the hotel customer upon detection of the medium lent to the customer, wherein the questionnaire contains at least one question related to the following services and equipment: bedroom cleanliness, bathroom cleanliness, lighting, television, and bed;
  an inputting part that allows the customer to respond to the questionnaire; and
  a questionnaire transmission part that transmits the customer responses, the extracted customer identification information, and the extracted hotel room number to said service supporting server;
  a discount ticket printing part that prints a discount ticket for the hotel customer using the extracted customer identification information;

wherein said service supporting server comprises:

a customer response analysis part that analyzes the received customer responses to determine that a service or equipment failure exists, wherein the service or equipment failure comprises one of: a bedroom cleanliness failure, a bathroom cleanliness failure, a lighting failure, a television failure, and a bed failure;

a message transmitting part that automatically transmits a message from the customer response analysis part to an operator terminal selection part when a service or equipment failure requiring an emergency response has been identified, wherein the message includes contents of the failure and the extracted hotel room number associated with the failure;

an operator terminal selection part that automatically selects an operator terminal from a plurality of operator terminals configured to receive emergency responses from the service supporting system, wherein the selected operator terminal is associated with the determined service or equipment failure based on whether the failure is a bedroom cleanliness failure, a bathroom cleanliness failure, a lighting failure, a television failure, or a bed failure; and a failure transmission part that transmits failure information and the room number associated with the failure to the selected operator terminal associated with the failed service or equipment.

* * * * *